(12) United States Patent
Matsushiro et al.

(10) Patent No.: US 7,421,119 B2
(45) Date of Patent: Sep. 2, 2008

(54) LIGHT SOURCE PRESUMING METHOD AND APPARATUS

(75) Inventors: Nobuhito Matsushiro, Tokyo (JP); Noriharu Fujiwara, Tokyo (JP)

(73) Assignee: Oki Data Corporation, Tokyo (JP)

( * ) Notice: Subject to any disclaimer, the term of this patent is extended or adjusted under 35 U.S.C. 154(b) by 886 days.

(21) Appl. No.: 10/887,953

(22) Filed: Jul. 9, 2004

(65) Prior Publication Data

US 2005/0007774 A1  Jan. 13, 2005

(30) Foreign Application Priority Data

Jul. 11, 2003  (JP) .............................. 2003-195727

(51) Int. Cl.
*G06K 9/00* (2006.01)
*F21V 9/00* (2006.01)
(52) U.S. Cl. ...................... 382/167; 382/162; 362/231
(58) Field of Classification Search ......... 382/162–167; 358/500, 501, 510, 1.9; 362/231, 5
See application file for complete search history.

(56) References Cited

U.S. PATENT DOCUMENTS 6,356,364 B2 * 3/2002 Matsushiro et al. .......... 358/1.9

FOREIGN PATENT DOCUMENTS

JP  2001-245166 A  9/2001

* cited by examiner

*Primary Examiner*—Duy M. Dang
(74) *Attorney, Agent, or Firm*—Pantich Schwarze Belisario & Nadel LLP

(57) ABSTRACT

A light source presuming apparatus includes: a candidate light source color obtaining unit which obtains candidate light source colors; a guide light source color holding unit which holds guide light source colors for guiding obtainment of parameters of a color adaptation model showing color adaptation of the sight sense from the candidate light source colors to a reference light source color; a guide parameter obtaining unit which obtains such parameters so as to be guided to the guide light source colors; an error converging unit which obtains light source colors, as correction candidate light source colors, having the relation showing the color adaptation of the sight sense with the reference light source color by using the color adaptation model shown by guide parameters, substitutes the correction candidate light source colors for the candidate light source colors, and converges errors included in the candidate light source colors; and a light source color presuming unit which presumes the correction candidate light source color of the minimum errors as a light source color of the image data.

18 Claims, 16 Drawing Sheets

IMAGE DATA → 11, 20, 12, 13, 14, 16, 15, 17 → LIGHT SOURCE COLOR OF IMAGE DATA

LIGHT SOURCE COLOR OF IMAGE DATA

LIGHT SOURCE PRESUMING METHOD AND APPARATUS

BACKGROUND OF THE INVENTION

1. Field of the Invention

The invention relates to a method and an apparatus for presuming a light source color upon photographing in image data obtained by a digital camera or the like.

2. Related Background Art

The user can freely modify image data photographed by a digital camera or the like by using computer software called photo-retouching software. However, the modification of the image data to be seen as if an image were seen under a certain light source color requires of the user a sense of color and expertise, and without them, the modification of the image needs him to spend much labor and time. As a technique for solving such a problem, a color image converting apparatus for converting the image data to be seen as if under a desired light source color has been disclosed in JP-A-2001-245166.

According to the color image converting apparatus disclosed in JP-A-2001-245166, pixels which seem to be the light source color upon photographing are selected as candidate light source colors from the image data, a color adaptation model showing color adaptation of a sense of sight from the candidate light source colors to a desired predetermined light source color is used, and parameters of the color adaptation model which minimize an evaluating function for the color adaptation model are calculated. After that, the color image converting apparatus converts the image data to be seen as if under a desired light source color by using the color adaptation model shown by those parameters.

According to the foregoing conventional image converting apparatus, merely the selection of the candidate light source colors from the image data is disclosed and whether or not the selected candidate light source color corresponds to the light source color upon photographing is not presumed. For example, even when the selected candidate light source color differs from the light source color upon photographing, the image converting apparatus executes the converting process on the basis of the candidate light source color different from true values of the light source color, so that the image data cannot be converted into the data to be seen as if under the desired light source color.

SUMMARY OF THE INVENTION

It is, therefore, an object of the invention to provide a method of presuming whether or not selected candidate light source color corresponds to a light source color at the time of obtaining image data.

According to the present invention, there is provided a light source presuming method of presuming a light source color of image data, comprising the steps of:

obtaining candidate light source color as candidates for the light source color of the image data;

obtaining parameters of a color adaptation model showing color adaptation of a sense of sight from the obtained candidate light source color to a predetermined reference light source color so as to be guided to parameters of a color adaptation model showing color adaptation of the sense of sight from known guide light source color to the reference light source color;

obtaining light source color, as correction candidate light source color, having a relation of the color adaptation of the sense of sight with the reference light source color in a model state shown by the obtained guide parameters, substituting the correction candidate light source color for the candidate light source color, and converging errors included in the candidate light source color; and presuming the correction candidate light source color whose errors are minimized by the convergence as a light source color of the image data.

In the light source presuming method, the candidate light source color to be obtained includes a plurality of different light source colors.

Further, in the light source presuming method, the guide light source color includes a plurality of different light source colors.

Further, in the light source presuming method, the parameters of the color adaptation model are obtained by a Lagrangean undetermined multiplier method in which a restricting condition for maintaining brightness before and after conversion of the image data according to the color adaptation model has been set.

Further, in the light source presuming method, a second guide light source color is set near the guide light source color corresponding to the correction candidate light source color so as to further converge the errors included in the correction candidate light source color which has been presumed as a light source color; the correction candidate light source color which has been presumed as a light source color is newly set as a candidate light source color; the parameters of the color adaptation model showing the color adaptation of the sense of sight from the candidate light source colors to the reference light source color are obtained so as to be guided to parameters of a color adaptation model showing color adaptation of the sense of sight from the second guide light source color to the reference light source color; light source colors having a relation of the color adaptation of the sense of sight with the reference light source color are newly obtained as correction candidate light source colors in a model state shown by the newly obtained guide parameters, the correction candidate light source colors are substituted for the candidate light source colors, and errors included in the newly set candidate light source colors are converged; and the correction candidate light source color whose errors are minimized by the convergence is presumed as a light source color of the image data.

In the light source presuming method, the guide light source colors which are newly set are a plurality of different light source colors.

Further, according to the present invention, there is also provided a light source presuming apparatus for presuming a light source of image data, comprising:

a candidate light source color obtaining unit which obtains candidate light source color as candidates for the light source color of the image data;

a guide light source color holding unit which holds known guide light source color so as to guide obtainment of parameters of a color adaptation model showing color adaptation of a sense of sight from the obtained candidate light source color to a predetermined reference light source color;

a guide parameter obtaining unit which obtains the parameters of the color adaptation model showing the color adaptation of the sense of sight from the obtained candidate light source color to the reference light source coloro as to be guided to parameters of a color adaptation model showing a color adaptation of the sense of sight from the guide light source color held in the guide light source color holding unit to the reference light source color;

an error converging unit which obtains light source color, as correction candidate light source color, having a relation of the color adaptation of the sense of sight with the reference light source color in a model state shown by the obtained guide parameters, substituting the correction candidate light source color for the candidate light source color, and converging errors included in the candidate light source color; and a light source color presuming unit which presumes the correction candidate light source color whose errors are minimized by the convergence as a light source color of the image data.

In the light source presuming apparatus, the candidate light source color to be obtained includes a plurality of different light source colors.

Further, in the light source presuming apparatus, the guide light source color includes a plurality of different light source colors.

Further, in the light source presuming apparatus, the parameters of the color adaptation model are obtained by a Lagrangean undetermined multiplier method in which a restricting condition for maintaining brightness before and after conversion of the image data according to the color adaptation model has been set.

Further, the light source presuming apparatus may further comprise a guide light source color resetting unit which sets a second guide light source color to a position near the guide light source color corresponding to the correction candidate light source color so as to further converge the errors included in the correction candidate light source color which has been presumed as a light source color, and wherein after the correction candidate light source color which has been presumed as a light source color is newly set as a candidate light source color, in the guide parameter obtaining unit, the parameters of the color adaptation model showing the color adaptation of the sense of sight from the obtained candidate light source colors to the predetermined reference light source color are obtained so as to be guided to parameters of a color adaptation model showing color adaptation of the sense of sight from the second guide light source colors to the reference light source color, in the error converging unit, in a model state shown by the obtained guide parameters, light source colors having a relation of the color adaptation of the sense of sight with the reference light source color is newly obtained as correction candidate light source colors, the correction candidate light source colors are substituted for the candidate light source colors, and errors included in the newly set candidate light source color are converged, and the apparatus has a second light source color presuming unit which presumes the correction candidate light source color whose errors are minimized by the convergence as a light source color of the image data.

In this case, the guide light source colors which are newly set are a plurality of different candidate light source colors.

Further, according to the present invention, there is also provided a light source presuming apparatus for presuming a light source color of image data, comprising:

a first distribution value obtaining unit which obtains a first distribution value in which a feature amount regarding coloration of the image data has been converted into a numerical value;

a candidate light source color obtaining unit which obtains candidate light source colors as candidates for the light source color of the image data;

a conversion parameter obtaining unit which obtains parameters, as conversion parameters, of a color adaptation model showing color adaptation of a sense of sight from the obtained candidate light source colors to a predetermined reference light source color;

a second distribution value obtaining unit which obtains a second distribution value in which a feature amount regarding coloration of conversion image data obtained by converting the image data by using a color adaptation model shown by the obtained conversion parameters has been converted into a numerical value; and a light source color presuming unit which compares the obtained second distribution value with the first distribution value, selects the second distribution value in which a difference between them is the minimum, and presumes the candidate light source color corresponding to the selected second distribution value as a light source color of the image data.

In the light source presuming apparatus, the candidate light source colors which are obtained are a plurality of different light source colors.

Further, the light source presuming apparatus may further comprise a convergence parameter obtaining unit which obtains the parameters, as convergence parameters, of the color adaptation model showing the color adaptation of the sense of sight from the candidate light source colors to the reference light source color so as to converge errors included in the obtained candidate light source colors; and an error converging unit which obtains light source colors, as correction candidate light source colors, having a relation of the color adaptation of the sense of sight with the reference light source color in a model state shown by the obtained convergence parameters, substitutes the correction candidate light source colors for the candidate light source colors, and converges the errors included in the candidate light source colors.

In the case, the convergence parameters of the color adaptation model are obtained by using a Lagrangean undetermined multiplier method in which a restricting condition for maintaining brightness before and after conversion of the image data according to the color adaptation model has been set.

Further, the light source presuming apparatus may further comprise a convergence parameter obtaining unit which obtains the parameters, as convergence parameters, of the color adaptation model showing the color adaptation of the sense of sight from the candidate light source colors to the reference light source color so as to converge errors included in the obtained candidate light source colors; an error converging unit which obtains light source colors, as correction candidate light source colors, having a relation of the color adaptation of the sense of sight with the reference light source color in a model state shown by the obtained convergence parameters, substitutes each of the correction candidate light source colors for each of the candidate light source colors, and converges the errors included in each of the candidate light source colors; and a correction candidate light source color obtaining unit which newly obtains a plurality of candidate light source colors as correction candidate light source colors from a relational line which mutually connects chromaticity coordinate values of the candidate light source colors whose errors have been converged.

In the case, the convergence parameters of the color adaptation model are obtained by using a Lagrangean undetermined multiplier method in which a restricting condition for maintaining brightness before and after conversion of the image data according to the color adaptation model has been set.

The above and other objects and features of the present invention will become apparent from the following detailed description and the appended claims with reference to the accompanying drawings.

DETAILED DESCRIPTION OF THE PREFERRED EMBODIMENTS

Embodiments of the invention will now be described hereinbelow with reference to the drawings.

Embodiment 1

Figure 1:
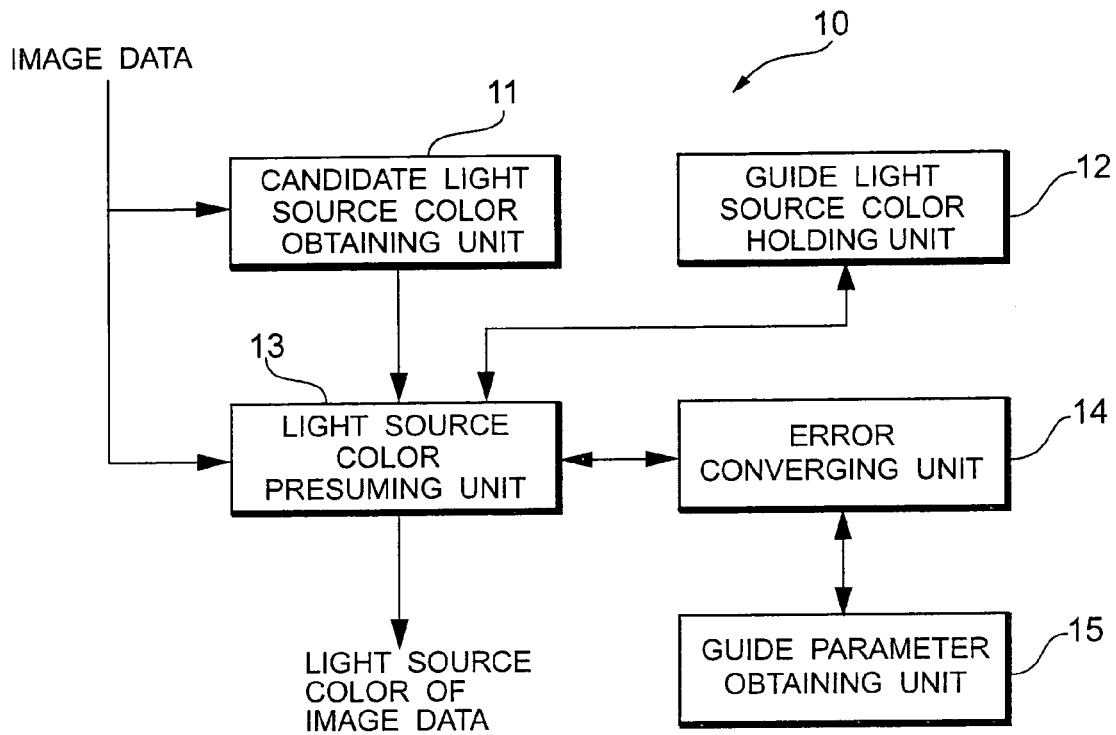
FIG. 1 is a block diagram of a light source presuming apparatus according to the embodiment 1.

FIG. 1 is a block diagram showing a construction of a light source presuming apparatus 10 according to the embodiment 1.

The light source presuming apparatus 10 comprises: a candidate light source color obtaining unit 11 which obtains a plurality of candidate light source colors as candidates for a light source color from image data; a guide light source color holding unit 12 which holds a plurality of guide light source colors that are used for deriving parameters of a color adaptation model, which will be explained hereinafter; a light source color presuming unit 13 which selects a correction candidate light source color that seems to be close to the light source color as a light source color of the image data from a plurality of correction candidate light source colors obtained by correcting a plurality of candidate light source colors obtained by the candidate light source color obtaining unit 11; an error converging unit 14 which substitutes the candidate light source colors for the correction candidate light source colors obtained by correcting the candidate light source colors by using the parameters of the color adaptation model and obtains an error from true values included in the correction candidate light source colors in order to converge the errors between the correction candidate light source colors and the true values of the light source color; and a guide parameter obtaining unit 15 which calculates the parameters of the color adaptation model having a relation showing color adaptation of a sense of sight with a predetermined reference light source color P* with respect to the candidate light source colors.

The candidate light source color obtaining unit 11 selects a plurality of pixels which seem to be the light source color from the image data and obtains chromaticity coordinate values of each of the selected pixels as candidate light source colors $P_i$ (i=1, 2, 3, ..., N).

When the guide light source color holding unit 12 calculates parameters of a color adaptation model of the sense of sight of a color appearance model while converging the error from the true values of the light source color included in the candidate light source colors, the holding unit 12 holds the chromaticity coordinate values which guide a convergence destination of the errors as guide light source colors $G_i$ (i=1, 2, 3, ..., M).

The light source color presuming unit 13 selects the correction candidate light source color that is closest to the true values of the light source color from the correction candidate light source colors obtained by converging the errors included in the candidate light source colors $P_i$ (i=1, 2, 3, ..., N) obtained by the candidate light source color obtaining unit 11 and outputs its chromaticity coordinate values of the selected candidate light source color as a light source color of the image data.

The error converging unit 14 forms a correction candidate light source color by correcting the candidate light source color by using the parameters of the color adaptation model. The correction candidate light source color is formed by a method whereby the candidate light source color is updated by the correction candidate light source color so that the errors between the candidate light source color and the true values of the light source color of the image data are converged and the foregoing correcting process and the updating process are repeated a predetermined number of times.

The guide parameter obtaining unit 15 calculates the parameters of the color adaptation model describing the color adaptation of the sense of sight to the reference light source color P* with respect to the candidate light source colors $P_i$. The guide light source colors $G_i$ are used as elements for calculating the parameters.

Prior to describing the operation of the light source presuming apparatus 10, a fundamental idea of the invention will be described by using numerical expressions and Tables.

As a prerequisite, since each pixel of the image data is ordinarily expressed by (R, G, B) by an RGB colorimetric system in the processes of the invention, a matrix arithmetic operation shown by the following equation (1) is executed in order to convert it from (R, G, B) into a vector (X, Y, Z) of an XYZ colorimetric system.

$$\begin{bmatrix} X \\ Y \\ Z \end{bmatrix} = \begin{bmatrix} 2.7689 & 1.7517 & 1.1302 \\ 1 & 4.5907 & 0.0601 \\ 0 & 0.0565 & 5.5943 \end{bmatrix} \cdot \begin{bmatrix} R \\ G \\ B \end{bmatrix} \quad (1)$$

Further, in the processes of the invention, color information of each pixel, the chromaticity coordinate values of the light source color, and the like mentioned above are expressed by using the vector (X, Y, Z) of the XYZ calorimetric system for the purpose of convenience of calculation. The above expression will be simply shown by (X, Y, Z) hereinbelow by omitting the word "vector". In the invention, the normalized (X, Y, Z) values will be used hereinbelow so that a value of Y in (X, Y, Z) converted from the RGB colorimetric system is aligned to a predetermined value Y(S). The normalization will be shown below.

For example, the conversion of the equation (1) is executed to the (R, G, B) values. When its result is shown by (X1, Y1, Z1), a process for aligning the value of Y to Y(S) is executed by using the following equation (2).

$$k = Y(S)/Y_1$$

$$X_2 = k \cdot X_1, \quad Y_2 = k \cdot Y_1, \quad Z_2 = k \cdot Z_1 \quad (2)$$

The color adaptation model will now be described by using the following equations (3) and (4). The equation (3) shows an example of the color adaptation model by a matrix M. $k_L$, $k_M$, and $k_S$ in the equation (3) show parameters of the color adaptation model. When there is a relation shown by the equation (4) among the color adaptation model M and chromaticity coordinate values $(X_A, Y_A, Z_A)$ of a light source color A and chromaticity coordinate values $(X_B, Y_B, Z_B)$ of a light source color B which are different from each other, by solving simultaneous equations regarding $k_L$, $k_M$, and $k_S$ of the color adaptation model, values $k_L$, $k_M$, and $k_S$ of the parameters of the color adaptation model are obtained. By applying the matrix M obtained by substituting those values $k_L$, $k_M$, and $k_S$ into the equation (3) to chromaticity coordinate values of an object under the light source color A, chromaticity coordinate values which are perceived by human beings can be converted as if the object were seen under the light source color B.

$$M = \begin{bmatrix} m11 & m12 & m13 \\ m21 & m22 & m23 \\ m31 & m32 & m33 \end{bmatrix} \quad (3)$$

$$= \begin{bmatrix} 0.74k_L + 0.26k_M & 1.32k_L - 1.32k_M & -0.15k_L - 0.05k_M + 0.2k_S \\ 0.14k_L - 0.14k_M & 0.26k_L + 0.74k_M & -0.03k_L + 0.03k_M \\ 0 & 0 & k_S \end{bmatrix}$$

and $$\begin{bmatrix} X_B \\ Y_B \\ Z_B \end{bmatrix} = M \begin{bmatrix} X_A \\ Y_A \\ Z_A \end{bmatrix} \quad (4)$$

A fundamental idea of the invention for presuming the light source color by using the color adaptation model will now be explained.

True values of the light source color of the image data are shown by $P_W = (X_W, Y_W, Z_W)$ and a known reference light source color is shown by $P^* = (X^*, Y^*, Z^*)$. Parameters $K_L^W$, $K_M^W$, and $K_S^W$ of the color adaptation model shown in the following equation (5) using those $P_W$ and $P^*$ are calculated.

The image data is converted by using the matrix M ($K_L^W$, $K_M^W$, $K_S^W$) obtained by substituting the parameters $K_L^W$, $K_M^W$, and $K_S^W$ into the equation (3). Thus, the image can be seen by human eyes as if the image data were obtained under the light source of the reference light source color P*. That is, assuming that the image data before the conversion is set to L and the image data after the conversion is set to L', this relation Ψ can be shown by the following equation (6). That is, the relation Ψ shows that the image data L' after the conversion is seen by human eyes as if the image data L of the image photographed under the light source color of $P_W$ were converted into the image data under the light source color of P*.

$$\begin{bmatrix} X^* \\ Y^* \\ Z^* \end{bmatrix} = M \begin{bmatrix} X_w \\ Y_w \\ Z_w \end{bmatrix} \quad (5)$$

$$\Psi(L, L', K_L^W, K_M^W, K_S^W) = 0 \quad (6)$$

In the invention, the light source color of the image data is presumed by using the equations (5) and (6) which are satisfied between the true values $P_W$ of the light source color of the image data and the reference light source color P*. If a candidate light source color P is close to the true values of the light source color, the parameters $K_L$, $K_M$, and $K_S$ which give the color adaptation from the candidate light source color P to the reference light source color P* satisfy the relation of the equation (6).

An error from the true values of the light source color included in the candidate light source color P can be expressed by a value of f of an evaluating function shown by the following equation (7) using the color adaptation model M according to the parameters $K_L$, $K_M$, and $K_S$ obtained under a condition which satisfy the relation Ψ.

As a condition which satisfy the relation Ψ of the equation (6), a restricting condition C shown by the following equation (8) which maintains the brightness before the conversion of the image data using the color adaptation model and after the conversion is considered.

$$f = \left( \begin{bmatrix} X^* \\ Y^* \\ Z^* \end{bmatrix} - M \begin{bmatrix} X \\ Y \\ Z \end{bmatrix} \right)^2 \quad (7)$$

and $$\begin{aligned} C &= \Sigma y - \Sigma \{m21 \cdot x + m22 \cdot y + m23 \cdot z\} \quad (8) \\ &= \Sigma y - \Sigma \{(0.14k_L - 0.14k_M)x + (0.26k_L + 0.74k_M)y + (-0.03k_L + 0.03k_M)z\} \\ &= 0 \end{aligned}$$

(X, Y, Z) in the equation (8) denote the chromaticity coordinate values of the image data and Σ denotes a process for obtaining the sum of all pixels of the image data. Σ of the first term indicates the sum of Y in the XYZ calorimetric system of the pixels of the image data. Σ of the second term indicates the sum of Y in the XYZ colorimetric system after the conversion according to the color adaptation model M of the pixels of the image data. Therefore, the restricting condition C in the equation (8) shows that the brightness of the image data is maintained before and after the conversion of the color adaptation model.

As mentioned above, the parameters $K_L$, $K_M$, and $K_S$ which minimize f in the equation (7) under the restricting condition C in place of the relation $\Psi$ are obtained. A value of the error f at this time, that is, a value of the error from the true values of the light source color including the candidate light source color P is obtained as an evaluation value of the candidate light source color P.

To obtain the parameters $K_L$, $K_M$, and $K_S$ mentioned above, a conventionally known undetermined multiplier method of Lagrange for obtaining an extreme value under the restricting condition is used. The parameters $K_L$, $K_M$, and $K_S$ which minimize F shown in the following equation (9) are calculated by using the Lagrangean undetermined multiplier method. That is, the parameters $K_L$, $K_M$, and $K_S$ can be obtained by solving simultaneous equations shown by the following equations (10)

$$F = f \mu \cdot C \qquad (9)$$

in which F is partially differentiated with respect to each of $K_L$, $K_M$, and $K_S$, and $\mu$ and set to "0".

$$\begin{cases} \dfrac{\partial F}{\partial k_L} = 0 \\ \dfrac{\partial F}{\partial k_M} = 0 \\ \dfrac{\partial F}{\partial k_S} = 0 \\ \dfrac{\partial F}{\partial \mu} = 0 \end{cases} \qquad (10)$$

The smaller the value of f obtained by substituting the parameters $K_L$, $K_M$, and $K_S$ obtained by solving the equations (10) as mentioned above into the equation (7) is, the smaller the error included in the candidate light source color P is. That is, it is close to the true value of the light source color of the image data. By obtaining the parameters $K_L$, $K_M$, and $K_S$ as a solution of the equations (10) and obtaining the value of f by substituting the values of the obtained parameters $K_L$, $K_M$, and $K_S$ into the equation (7), the error from the true value of the light source color included in the candidate light source color can be evaluated.

Figure 2:
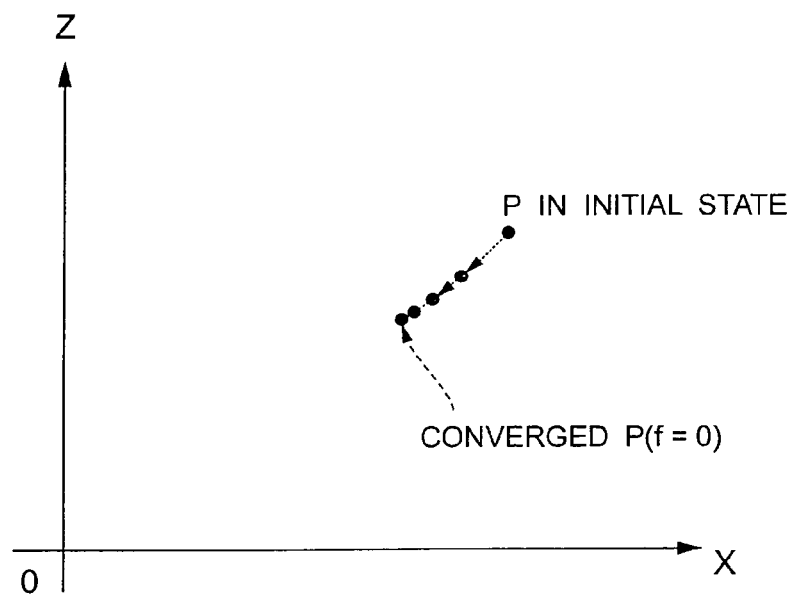
FIG. 2 is a chromaticity coordinate diagram in which errors included in candidate light source colors are converged.

Further, when an evaluation value is not equal to 0, by the inverse conversion from P* according to the matrix M obtained by substituting the obtained parameters $K_L$, $K_M$, and $K_S$ into the equation (7), that is, by replacing P with P'=(X', Y', Z') obtained by the following equation (11), the error included in the candidate light source color P is corrected so as to be adapted to the color adaptation model which is determined by the calculated parameters $K_L$, $K_M$, and $K_S$. By setting the correction candidate light source color P' to the candidate light source color P again and repeating the foregoing procedure, the error included in the candidate light source color P is converged. Finally, the error is converged to a situation in which the parameters $K_L$, $K_M$, and $K_S$ of f=0 is obtained by the equations (10). According to the candidate light source color P at this time, the error from the true values included in the initial candidate light source color P=(X, Y, Z) has been corrected as much as possible in the construction of the color adaptation model of the color appearance. FIG. 2 shows a state where the candidate light source color P is updated by repeating the calculation of the parameters and the replacement by the equation (11).

$$\begin{bmatrix} X' \\ Y' \\ Z' \end{bmatrix} = M^{-1} \begin{bmatrix} X^* \\ Y^* \\ Z^* \end{bmatrix} \qquad (11)$$

According to the invention, in addition to the foregoing fundamental idea, when the parameters of the color appearance model of the sense of sight of the color adaptation model is calculated while converging the errors between the candidate light source color and the true values of the light source color, the chromaticity coordinate values serving as indices which are used for converging the errors are used as a guide light source color and the parameters $K_{Lg}$, $K_{Mg}$, and $K_{Sg}$ which give the color adaptation from $G(X_g, Y_g, Z_g)$ to the known reference light source color P* are first obtained. That is, the parameters $K_{Lg}$, $K_{Mg}$, and $K_{Sg}$ which satisfy a relation of the following equation (12) are obtained.

$$\begin{bmatrix} X^* \\ Y^* \\ Z^* \end{bmatrix} = M \begin{bmatrix} X_g \\ Y_g \\ Z_g \end{bmatrix} \qquad (12)$$

According to the invention, the value of the error f is obtained by using the following equation (13) in place of the equation (7) for obtaining the evaluation value f.

$W_g$ in the equation (13) denotes a weight coefficient which is properly determined. The equation (13) is an equation obtained by substituting f1 for f in the equation (7) and adding a term of $$W_g\{(k_L \cdot k_{Lg})^2 + (k_M \cdot k_{Mg})^2 + (k_S \cdot k_{Sg})^2\}$$

in addition to f1. F in the equation (9) is minimized by using f in the equation (13). That is, the parameters $K_L$, $K_M$, and $K_S$ which minimize F in the following equation (14) are obtained by using the Lagrangean undetermined multiplier method. f in the equation (13) mentioned above is used as an error from the true values of the light source color of the image data including the candidate light source color P. When f in the equation (13) is not equal to 0, the substitution of the candidate light source color P is performed by P'=(X', Y', Z') in the equation (11) in a manner similar to that mentioned above.

$$f = f1 + w_g\{(k_L - k_L^g)^2 + (k_M - k_M^g)^2 + (k_S - k_S^g)^2\} \qquad (13)$$
$$= \left\| \begin{bmatrix} X^* \\ Y^* \\ Z^* \end{bmatrix} - M \begin{bmatrix} X \\ Y \\ Z \end{bmatrix} \right\|^2 + w_g\{(k_L - k_L^g)^2 + (k_M - k_M^g)^2 + (k_S - k_S^g)^2\}$$

and $$F = \left\| \begin{bmatrix} X^* \\ Y^* \\ Z^* \end{bmatrix} - M \begin{bmatrix} X \\ Y \\ Z \end{bmatrix} \right\|^2 + \qquad (14)$$
$$\mu_g\{(k_L - k_L^g)^2 + (k_M - k_M^g)^2 + (k_S - k_S^g)^2\} - \mu \cdot C$$

A process for solving the equation (7) mentioned above by using the Lagrangean undetermined multiplier method is equivalent to a process for obtaining the parameters of the color adaptation model which minimize the error of the color adaptation from the candidate light source color P to the reference light source color P* as much as possible in the conditions which satisfy the restricting condition C. By allowing a term corresponding to a guide light source color G to be included in the equation (13), the parameters are oriented at the time of the calculation so as to approach the parameters, as possible, which give the color adaptation from the guide light source color G to the reference light source color P*. The parameters of the color adaptation model oriented as mentioned above are obtained as guide parameters.

By repeating the parameter calculating process in the equation (13) and the updating process in the equation (11) to the candidate light source color P, a locus on an XZ plane of the candidate light source color P to be updated is pulled in the direction of the guide light source color G. Such a state is shown in FIG. 3.

Figure 3:
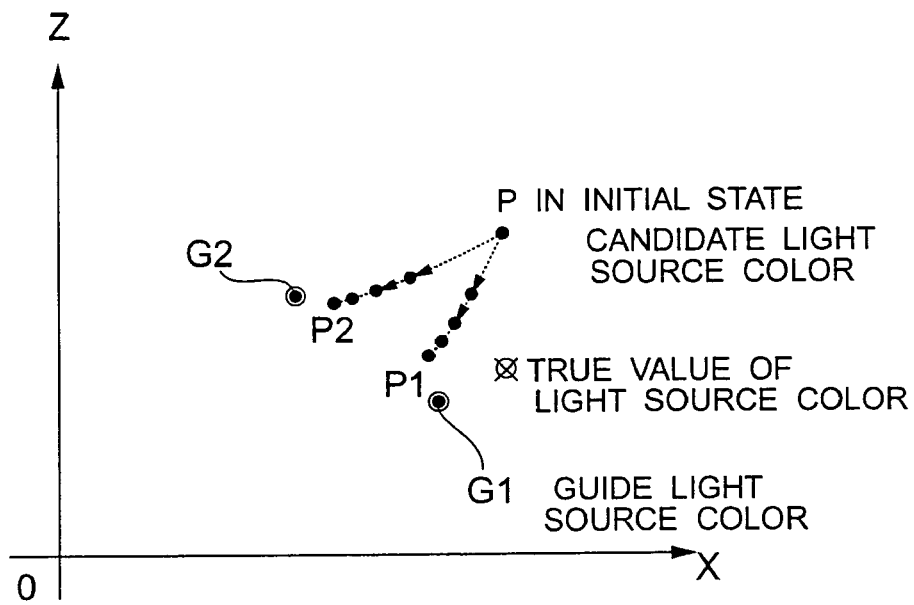
FIG. 3 is a chromaticity coordinate diagram in which the errors included in the candidate light source colors are guided to guide light source colors and converged.

FIG. 3 shows a candidate light source color P1 guided by a guide light source color G1 and a candidate light source color P2 guided by a guide light source color G2 in the case where those colors P1 and P2 are obtained by a method whereby the different chromaticity coordinate values are set to the guide light source colors G1 and G2 and the calculation of the guide parameters in f in the equation (13) and the updating process in the equation (11) are repeated to the non-updated candidate light source color P in the initial state.

With respect to P1 and P2 as results obtained by updating the candidate light source color P in each direction the same number of times in the foregoing processes, the more the guide light source color is close to the light source color of the image data, the more the value of f1 of the first term of f in the equation (13) for the guide parameters $K_L$, $K_M$, and $K_S$ at such a point of time decreases. In FIG. 3, since the guide light source color G1 is closer to the true values of the light source color than the guide light source color G2, the f1 value for the candidate light source color P1 is smaller than that for the candidate light source color P2.

As mentioned above, by using the guide light source colors, the state where the candidate light source color P in the initial state is away from the true values and corrected while being updated to the wrong chromaticity coordinate values can be suppressed, or the state where it is updated to the wrong chromaticity coordinate values can be measured as numerical values.

Figure 4:
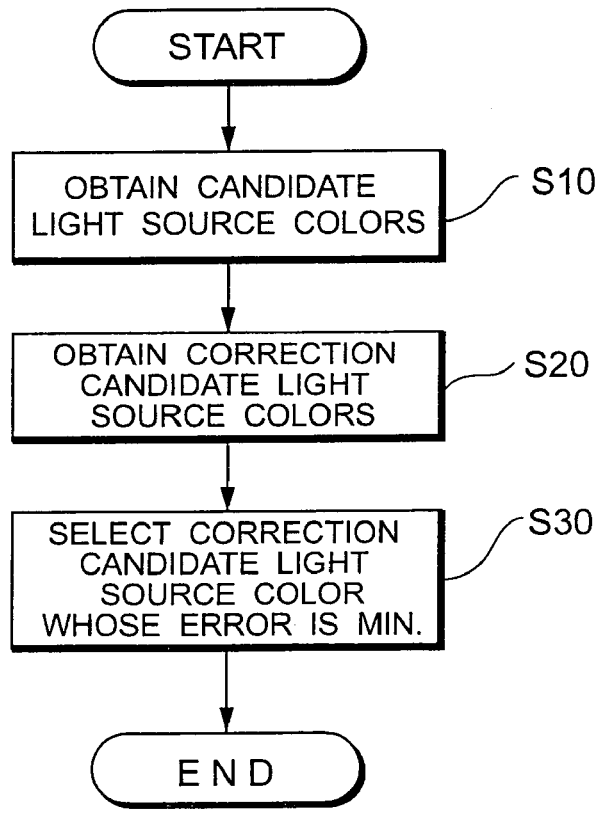
FIG. 4 is a flowchart showing the operation of the light source presuming apparatus in the embodiment 1.

The operation of the light source presuming apparatus 10 of the invention will now be described with reference to a flowchart shown in FIG. 4.

The candidate light source color obtaining unit 11 of the light source presuming apparatus 10 selects a plurality of pixels which seem to be the light source color from the image data and obtains the chromaticity coordinates of the selected pixels as candidate light source colors $P_i$ (i=1, 2, 3, . . . , N) (step S10).

Figure 5:
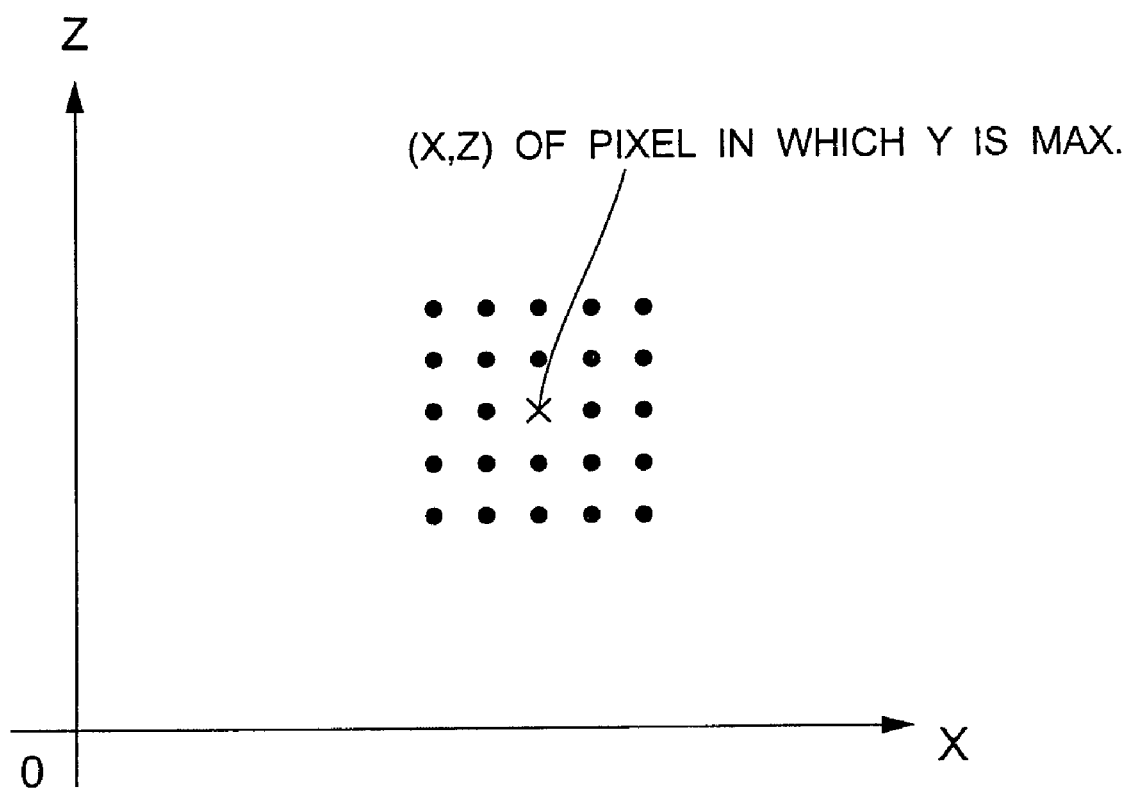
FIG. 5 is a chromaticity coordinate diagram showing selection of candidate light source colors.

In the selection of the plurality of pixels, for example, when the pixels constructing the image data are shown by the XYZ calorimetric system as shown in FIG. 5, the brightest pixel is searched for and the chromaticity coordinate values near the (X, Z) values of such a pixel are discretely obtained. There is also another method whereby an XZ range comprehensively containing chromaticity coordinate points which can be presumed as a light source color is predetermined and the chromaticity coordinate values contained in such a range are discretely obtained.

When the candidate light source colors $P_i$ are obtained by the candidate light source color obtaining unit 11, the error converging unit 14 obtains the parameters of the color adaptation model which minimize F shown in the equation (14) mentioned above as guide parameters from the guide parameter obtaining unit 15. Subsequently, correction candidate light source colors $P'_{ij}$ obtained by correcting the candidate light source colors $P_i$ are formed by an inverse matrix of the color adaptation model shown in the equation (11) by using the guide parameters from the guide parameter obtaining unit 15 so that the errors included in the candidate light source colors $P_i$ obtained by the candidate light source color obtaining unit 11 by using the color adaptation model shown by the guide parameters are converged so as to be attracted to the guide light source colors $G_i$ held in the guide light source color holding unit 12. Errors $f1_{ij}$ of the correction candidate light source colors $P'_{ij}$ are calculated by using the equation (13) (step S20).

The guide parameter obtaining unit 15 uses the reference light source color P* when the parameters of the color adaptation model which minimize F shown in the equation (14) are calculated. The reference light source color P* is selected from known light source colors such as A light source, D65 light source, D50 light source, and the like.

The guide parameter obtaining unit 15 uses the foregoing guide light source colors $G_i$ held in the guide light source color holding unit 12. As a selecting method in this case, there is a method whereby, for example, the XZ range comprehensively containing the chromaticity coordinate points which can be presumed as a light source color is predetermined, the chromaticity coordinate values contained in such a range are discretely obtained, and the obtained chromaticity coordinate values are set to the guide light source color. There is another method whereby the chromaticity coordinate values of the known light source colors such as A light source color, D65 light source color, D50 light source color, and the like are set to the respective guide light source colors, or the like.

The light source color presuming unit 13 selects the minimum $f1_{ij}$ from the errors $f1_{ij}$ formed by the error converging unit 14 and outputs the correction candidate light source colors $P'_{ij}$ corresponding to the selected $f1_{ij}$ as a light source color of the image data (step S30).

The detailed operation of the light source color presuming unit 13 will be described with reference to a flowchart of FIG. 6.

A counter i for executing the process is initialized for the candidate light source colors $P_i$ (i=1, 2, 3, . . . , N) obtained by the candidate light source color obtaining unit 11 (step S401).

A counter j for processing is subsequently initialized by using the guide light source colors $G_i$ (i=1, 2, 3, . . . , M) held in the guide light source color holding unit 12 every candidate light source colors $P_i$ (i=1, 2, 3, . . . , N) (step S402). That is, with respect to a certain candidate light source color, the process is executed every guide light source color held in the guide light source color holding unit 12 and such a process is executed for all of the candidate light source colors obtained by the candidate light source color obtaining unit 11.

After the counter is initialized, $P_i$ shown by the counter i are set into the candidate light source color P to be presumed (step S403).

When the candidate light source color P is set, the guide parameters are calculated by the guide parameter obtaining unit 15 on the basis of the candidate light source color P, predetermined reference light source color P*, and guide light source colors $G_i$. The correction candidate light source colors $P'_{ij}$ in which the error of the candidate light source color P has been converged are calculated by the error converging unit 14 by using the color adaptation model shown by those parameters (step S404).

After the correction candidate light source colors $P'_{ij}$ are obtained, the errors $f1_{ij}$ of the correction candidate light source colors $P'_{ij}$ are obtained as evaluation values (step S405).

After the errors $fl_{ij}$ are obtained, the counter j and the total number (M) of guide light source colors $G_i$ are compared in order to discriminate whether or not the processes for obtaining the correction candidate light source colors $P'_{ij}$ and their errors $fl_{ij}$ have been finished with respect to all of the guide light source colors $G_i$ (step S406).

If it is determined that the processes for all of the guide light source colors $G_i$ are not finished yet, the counter j is incremented and the processes after step S403 are repeated (step S407).

On the other hand, if the processes for all of the guide light source colors $G_i$ have been finished, the counter i and the total number (N) of candidate light source colors $P_i$ are compared in order to discriminate whether or not the processes for all of the candidate light source colors $P_i$ have been finished (step S408).

If it is determined that the processes for all of the candidate light source colors $P_i$ are not finished yet, the counter i is incremented and the processes after step S402 are repeated (step S409).

On the other hand, if the processes for all of the candidate light source colors $P_i$ have been finished, the minimum $fl_{ij}$ is selected and the correction candidate light source colors $P'_{ij}$ corresponding to the selected $fl_{ij}$ are outputted as a light source color of the image data (step S410).

The operation of the error converging unit 14 in step S404 mentioned above will now be described with reference to a flowchart of FIG. 7. Although the candidate light source colors $P_i$ and the guide light source colors $G_i$ have been described in the flowchart of FIG. 6 by showing the concept of a numerical value, the concept of the numerical value is omitted here and explanation will now be made merely by presuming the candidate light source color P and the guide light source color G for simplicity of explanation.

Parameters $K_L{}^g$, $K_M{}^g$, and $K_S{}^g$ of the color adaptation model of the foregoing equation (12) showing the color adaptation of the sense of sight from the guide light source color $G=(X_g, Y_g, Z_g)$ to the reference light source color P* are obtained (step S501). The calculated parameters $K_L{}^g$, $K_M{}^g$, and $K_S{}^g$ are used when the parameters $K_L$, $K_M$, and $K_S$ are calculated by the equation (14) in step S503, which will be explained hereinafter.

Subsequently, the counter i is initialized. Unlike the counter of the candidate light source colors shown in the flowchart of FIG. 6 mentioned above, the counter i is a counter for counting the number of processes for converging the errors (step S502).

After the counter is initialized, the parameters $K_L$, $K_M$, and $K_S$ of the color adaptation model which minimize F shown in the equation (14) are calculated by the guide parameter obtaining unit 15 by using the Lagrangean undetermined multiplier method (step S503).

By adding the parameters $K_L{}^g$, $K_M{}^g$, and $K_S{}^g$ which give the color adaptation from the guide light source color G to the reference light source color P* to the term of the equation (14), the parameters $K_L$, $K_M$, and $K_S$ which are close to the parameters which give the color adaptation from the guide light source color G to the reference light source color P* are calculated.

When the parameters $K_L$, $K_M$, and $K_S$ of the color adaptation model are calculated, the parameters $K_L$, $K_M$, and $K_S$ obtain the color adaptation model M shown by the equation (3), the correction candidate light source color P' is formed by applying an inverse matrix $M^{-1}$ to the reference light source color P* as shown in the equation (11), and the candidate light source color P is updated by the correction candidate light source color P' (step S504).

After the candidate light source color is updated by the correction candidate light source color P', whether or not a count value of the counter i has reached a predetermined counter value LOOP is discriminated (step S505).

When the count value of the counter i does not reach the counter value LOOP, the processes after step S503 mentioned above are repeated.

On the other hand, if the count value of the counter i has reached the counter value LOOP, the chromaticity coordinate values of the candidate light source color P at the present point of time, that is, the latest correction candidate light source color P' are outputted as a convergent point of the error f1.

The error f1 is converged by repeating the following processes: the guide parameters $K_L$, $K_M$, and $K_S$ which are close to the parameters which give the color adaptation from the guide light source color G to the reference light source color P* are calculated; the correction candidate light source color P' inversely converted from the reference light source color P* is formed by using the inverse matrix of the color adaptation model shown by the guide parameters; and the correction candidate light source color P' is substituted for the candidate light source color P.

If the counter value LOOP is set to a large value so that the error f1 becomes small enough, a long processing time is required. However, the error is converged and the convergent point can be made to approach the true values of the light source color. If too large a value is set into the counter value LOOP, the processes are repeated in the state where the value of the error f1 is close to 0, there is a possibility of causing a meaningful increase in processing time. It is, therefore, necessary to set a proper value into the counter value LOOP.

As mentioned above, according to the light source presuming apparatus 10 of the embodiment 1, in order to obtain the guide parameters of the color adaptation model showing the color adaptation of the sense of sight from the candidate light source color P as a candidate for the light source color of the image data to the predetermined reference light source color in such a manner that the guide parameters are also close to the parameters of the color adaptation model showing the color adaptation of the sense of sight from the guide light source color to the reference light source color, the following processes are repeated a predetermined number of times. That is, the guide parameters are obtained by using the Lagrangean undetermined multiplier method under such a restricting condition that the brightness is maintained before and after the conversion of the color adaptation model; the correction candidate light source color which is inversely converted from the reference light source color is formed by using the inverse matrix of the color adaptation model shown by the obtained guide parameters; the correction candidate light source color is substituted for the candidate light source color; and the error f in the replaced candidate light source color is obtained as an evaluation value. Further, according to the light source presuming apparatus 10 of the embodiment 1, after the above processes are executed every candidate light source color with respect to all of the guide light source colors, by selecting the correction candidate light source color whose evaluation value is the minimum as a light source color, the state where the correction candidate light source color is away from the true values and corrected while being updated to the wrong chromaticity coordinate values can be measured by the numerical value. Moreover, according to the light source presuming apparatus of the embodiment 1, since the light source color can be presumed on the basis of the evaluation value of each correction candidate light source color and the chromaticity coordinate values presumed to be the light source color have been corrected, the light source color of the image data can be precisely obtained.

Embodiment 2

A light source presuming apparatus 20 of the embodiment 2 will now be described.

Figure 8:
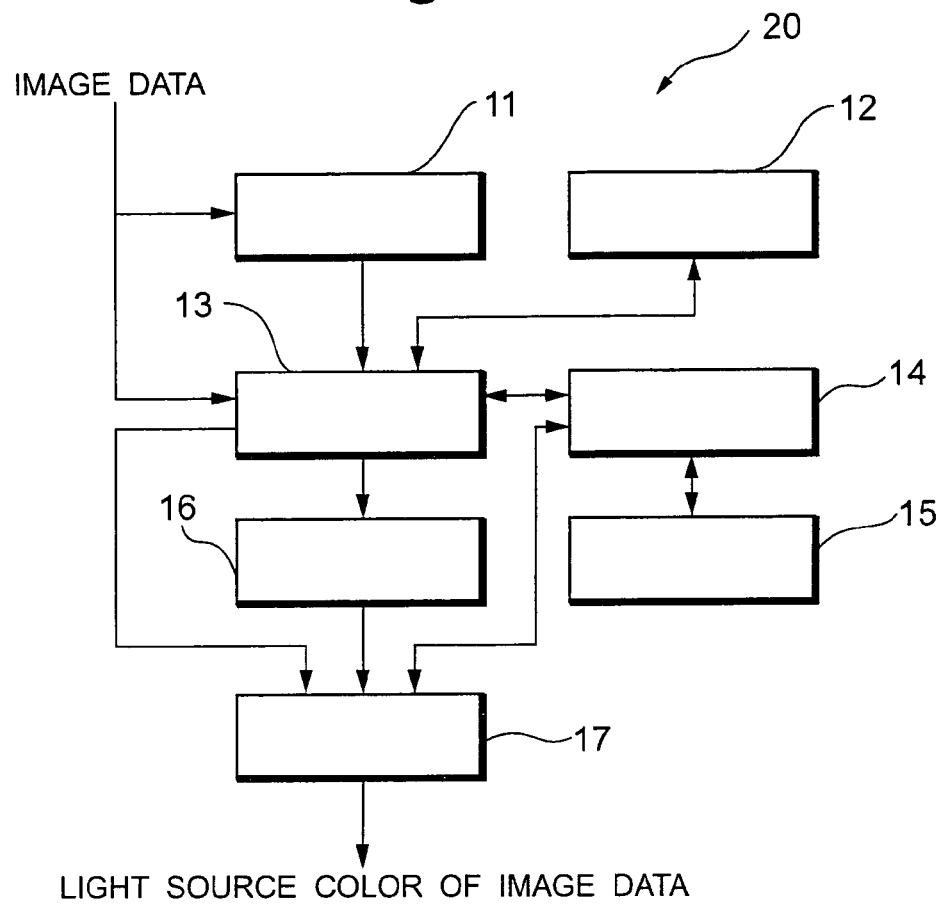
FIG. 8 is a block diagram of a light source presuming apparatus according to the embodiment 2.

FIG. 8 is a block diagram of the light source presuming apparatus 20 of the embodiment 2.

In addition to the construction of the light source presuming apparatus 10 of the embodiment 1 mentioned above, the light source presuming apparatus 20 of the embodiment 2 includes: a guide light source color resetting unit 16 which sets a plurality of second guide light source colors $g_i$ (i=1, 2, 3, ..., K) on the basis of guide light source colors $G_j$ corresponding to the correction candidate light source colors $P'_{ij}$ presumed by the light source color presuming unit 13; and a second light source color presuming unit 17 which presumes a correction candidate light source color whose error is the minimum as a light source color of the image data from the correction candidate light source colors obtained by newly converging the correction candidate light source colors presumed by the light source color presuming unit 13 every second correction candidate light source color by using the set plurality of second guide light source colors $g_i$.

Since the candidate light source color obtaining unit 11, guide light source color holding unit 12, error converging unit 14, and guide parameter obtaining unit 15 are the same as those in the embodiment 1, their description is omitted here.

Figure 6:
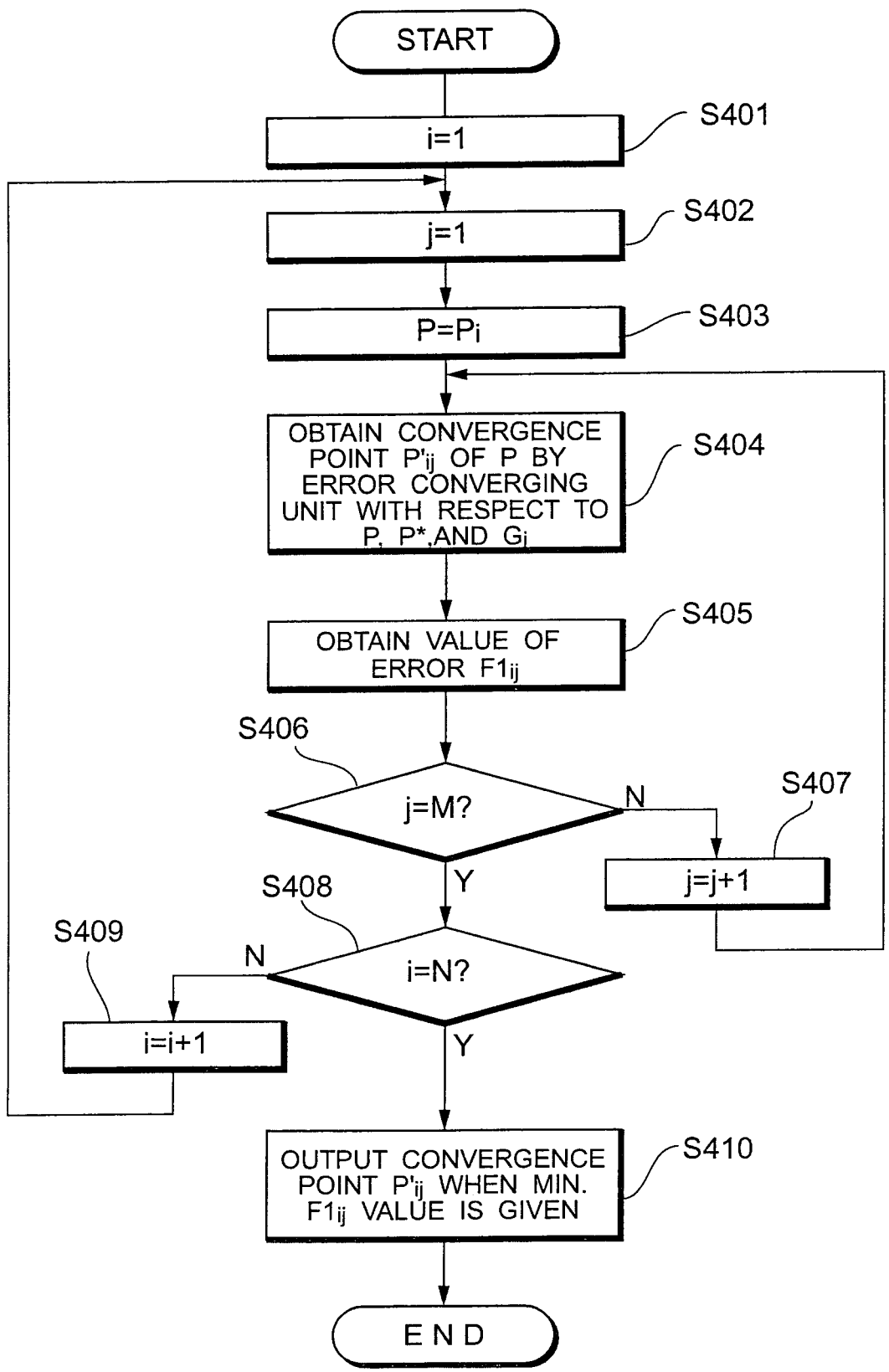
FIG. 6 is a flowchart showing the operation of a light source color presuming unit in the embodiment 1.
Figure 7:
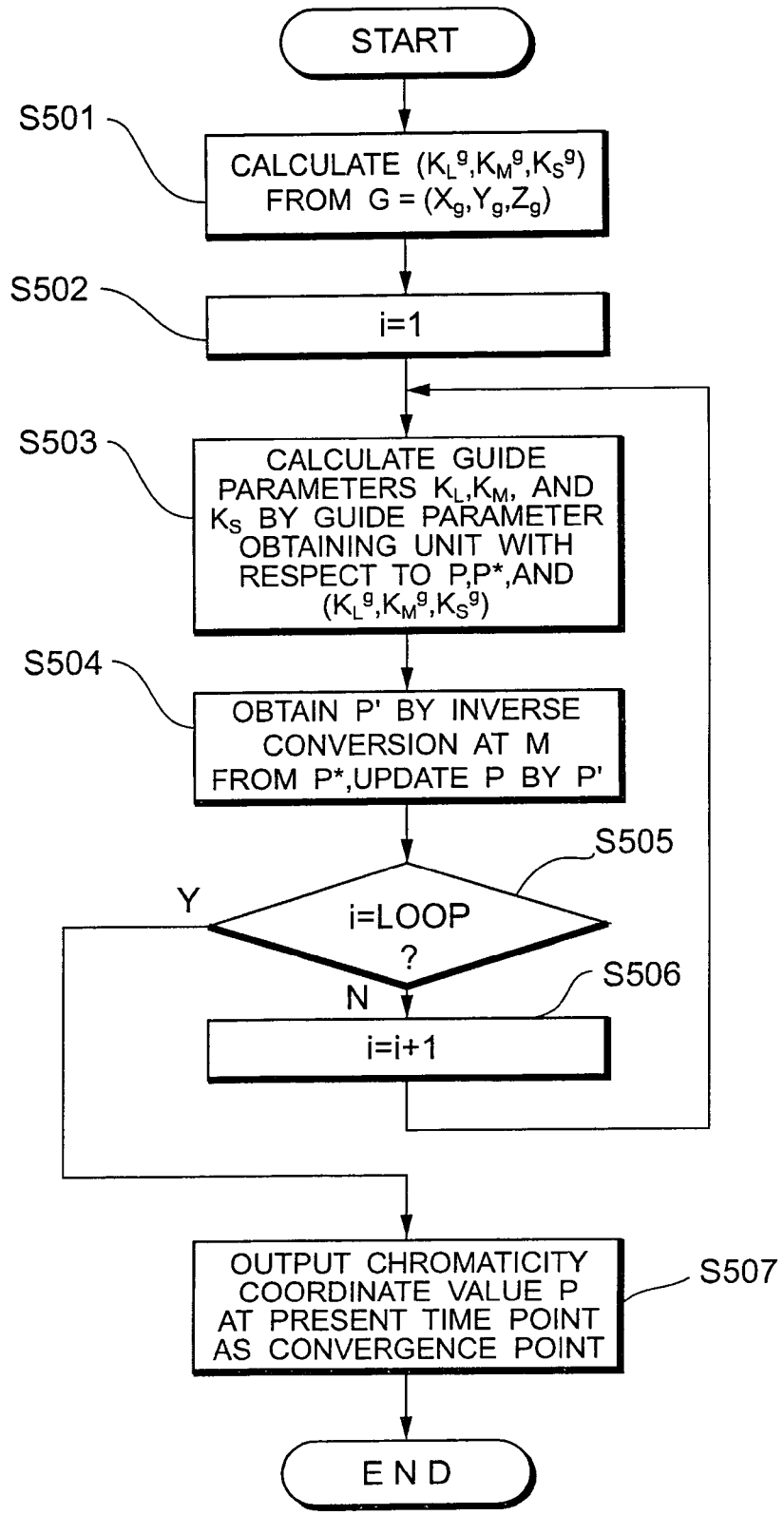
FIG. 7 is a flowchart showing the operation of an error converging unit in the embodiment 1.

Although the light source color presuming unit 13 is substantially the same as that in the embodiment 1, the process in step S410 in the flowchart of FIG. 6 differs. In the light source presuming apparatus 10 of the embodiment 1, the correction candidate light source color $P'_{ij}$ corresponding to the minimum error $f1_{ij}$ is outputted as a light source color, in the embodiment 2, the correction candidate light source color $P'_{ij}$ to be outputted and the guide light source color $G_j$ corresponding to the correction candidate light source color $P'_{ij}$ are outputted to the guide light source color resetting unit 16 and the second light source color presuming unit 17, which will be explained hereinafter.

Figure 9:
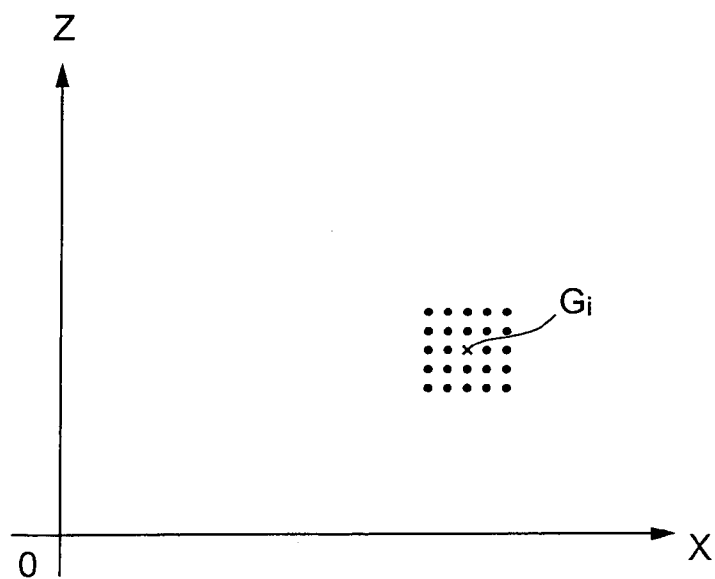
FIG. 9 is a chromaticity coordinate diagram showing setting of a second guide light source color.

When the guide light source color resetting unit 16 receives the guide light source color $G_j$ corresponding to the correction candidate light source color $P'_{ij}$ with respect to the minimum error $f1_{ij}$ selected by the light source color presuming unit 13, the resetting unit 16 discretely obtains the chromaticity coordinate values near $G_j$ on the XZ plane of the chromaticity coordinate values and sets them as second guide light source colors $g_i$ (i=1, 2, 3, ..., K). FIG. 9 shows a state of the setting of the second guide light source colors.

After the error included in P' is converged by the error converging unit 14 by using each of the second guide light source colors $g_i$ (i=1, 2, 3, ..., K) with respect to the correction candidate light source colors $P'_{ij}$ (hereinbelow, simply referred to as P' in the embodiment 2) whose error f1 is the minimum, the second light source color presuming unit 17 compares the converged error with the value of the error f1 obtained by using the equation (13) and outputs the correction candidate light source color corresponding to the minimum error f1 value.

Figure 10:
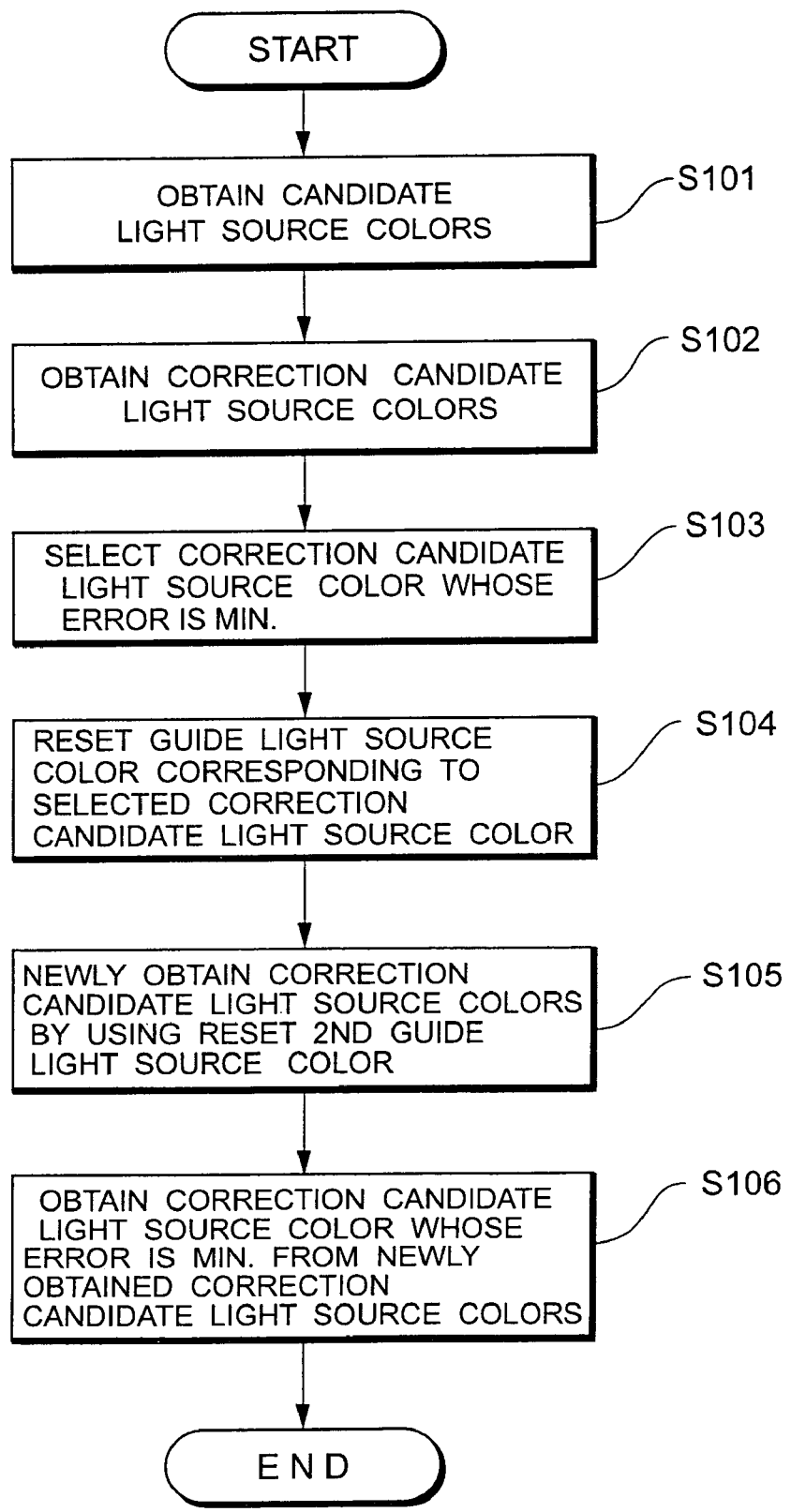
FIG. 10 is a flowchart showing the operation of the light source presuming apparatus in the embodiment 2.

The operation of the light source presuming apparatus 20 in the embodiment 2 will now be described with reference to a flowchart shown in FIG. 10.

The candidate light source color obtaining unit 11 of the light source presuming apparatus 20 selects a plurality of pixels which seem to be the light source color from the image data and obtains the chromaticity coordinate values of each of the selected pixels as candidate light source colors $P_i$ (step S101).

When the candidate light source colors $P_i$ are obtained by the candidate light source color obtaining unit 11, the correction candidate light source colors $P'_{ij}$ in which the error has been converged so as to guide the obtained candidate light source colors to the guide light source colors are obtained by using the guide light source colors $G_j$ by the error converging unit 14 (step S102).

The minimum error f1 is selected from the errors $f1_{ij}$ obtained for each of the correction candidate light source colors $P'_{ij}$ and the correction candidate light source colors $P'_{ij}$ corresponding to the selected $f1_{ij}$ and the guide light source colors $G_j$ corresponding to the correction candidate light source colors $P'_{ij}$ are outputted (step S103).

When the guide light source color resetting unit 16 receives the guide light source colors $G_j$ corresponding to the correction candidate light source colors $P'$ ($P'_{ij}$) selected by the light source color presuming unit 13, the resetting unit 16 discretely obtains the chromaticity coordinate values near $G_j$ and sets them as second guide light source colors $g_i$ (i=1, 2, 3, ..., K) (step S104).

After the second guide light source colors $g_i$ are set by the guide light source color resetting unit 16, correction candidate light source colors $P'_i$ obtained by converging the errors so as to guide the correction candidate light source colors P' presumed by the light source color presuming unit 13 to the second guide light source colors are obtained by the error converging unit 14 (step S105).

A minimum error $f1_i$ value is selected from each error $f1_i$ value of the correction candidate light source colors $P'_i$ in which the errors have been converged and chromaticity coordinate values of the correction candidate light source color $P'_i$ corresponding to the selected $f1_i$ is outputted as a light source color of the image data (step S106).

Figure 11:
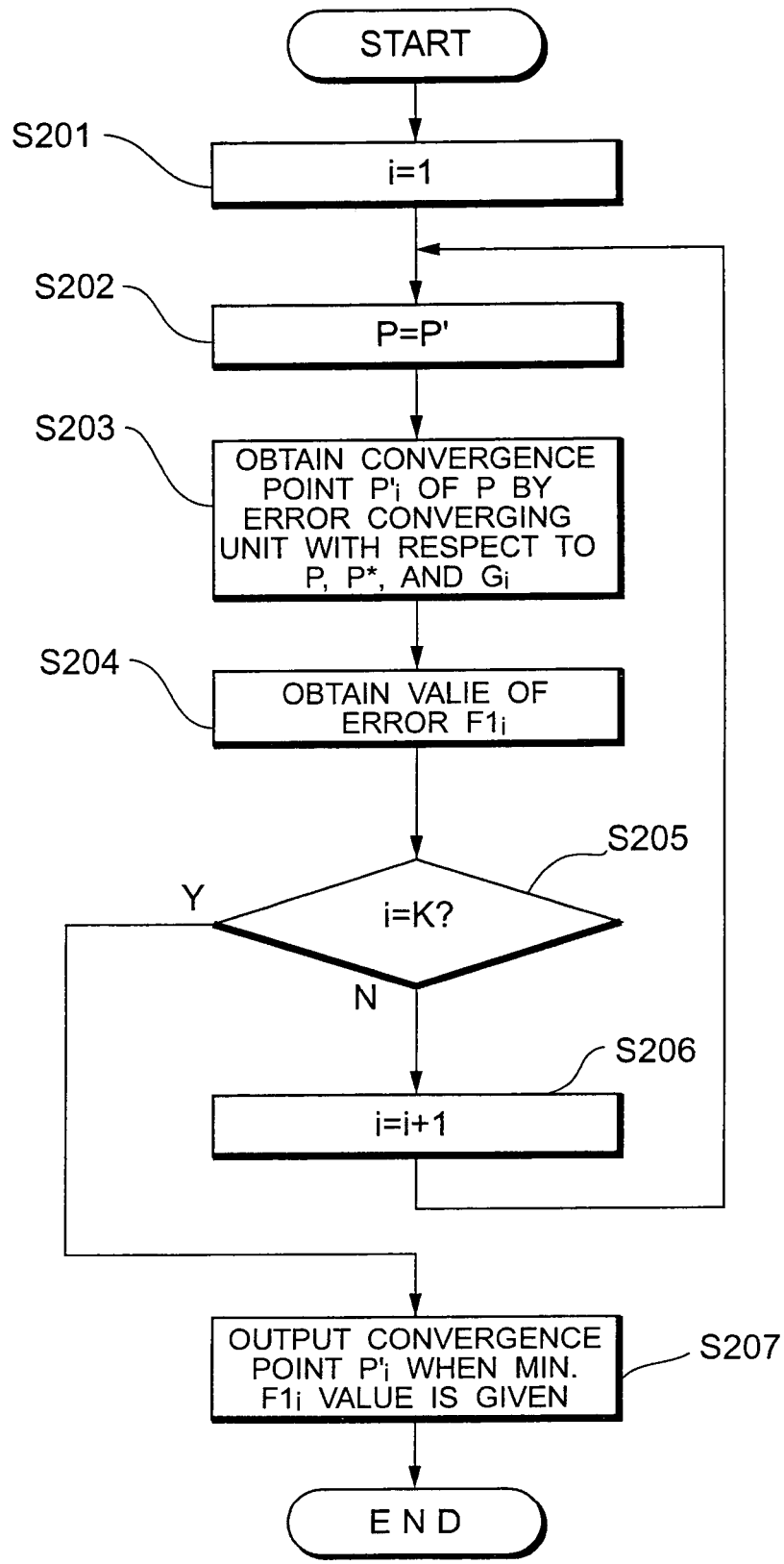
FIG. 11 is a flowchart showing the operation of a second light source color presuming unit.

The operation of the light source color presuming unit 17 will now be explained with reference to a flowchart shown in FIG. 11.

The counter i for processing by using the guide light source colors $g_i$ (i=1, 2, 3, ..., K) set by the guide light source color resetting unit 16 is initialized (step S201).

After the counter is initialized, the correction candidate light source color P' is set into the candidate light source color P to be presumed (step S202).

When the candidate light source color P is set, the correction candidate light source colors $P'_i$ in which the errors of the candidate light source color P have been converged are calculated by the error converging unit 14 by using the candidate light source color P, predetermined reference light source color P*, and second guide light source colors $g_i$ as parameters (step S203).

After the correction candidate light source colors $P'_i$ are obtained, the errors $f1_i$ of $P'_i$ are obtained (step S204).

After the errors $f1_i$ are obtained, the count value of the counter i and the total number K of the second guide light source colors $g_i$ are compared in order to discriminate whether or not the processes for obtaining the correction candidate light source colors $P'_i$ and the errors $f1_i$ have been finished with respect to all of the second guide light source colors $g_i$ (step S205). If it is determined that the processes for all of the second guide light source colors gi are not finished yet, the count value of the counter i is incremented and the processes after step S202 mentioned above are repeated (step S206).

On the other hand, if the processes for all of the second guide light source colors $g_i$ have been finished, the minimum $fl_i$ is selected and the correction candidate light source color $P'_i$ corresponding to the selected $fl_i$ is outputted as a light source color of the image data (step S207).

As mentioned above, according to the light source presuming apparatus of the embodiment 2, after a plurality of second guide light source colors $g_i$ are set near the guide light source colors $G_j$ of the correction candidate light source colors $P'_{ij}$ selected by the processes in the embodiment 1, in order to converge the errors included in the correction candidate light source colors $P'_{ij}$ so as to be attracted to the second guide light source colors $g_i$, the guide parameters of the color adaptation model are newly obtained by using the Lagrangean undetermined multiplier method under such a restricting condition that the brightness is maintained before and after the conversion of the color adaptation model. The correction candidate light source colors $P'_i$ are obtained by the inverse conversion using the color adaptation model shown by those parameters. The error $fl_i$ value of the correction candidate light source colors $P'_i$ is calculated. The light source presuming apparatus 20 selects the minimum error $fl_i$ value from the calculated error $fl_i$ values and outputs the correction candidate light source color $P'_i$ corresponding to the selected $fl_i$ value as a light source color of the image data. Thus, in addition to the effect of the embodiment 1, the light source color can be further precisely presumed.

Embodiment 3

A light source presuming apparatus 100 whose main construction differs from those of the embodiments 1 and 2 mentioned above will now be described. In the foregoing light source presuming apparatus 10 of the embodiment 1 and the foregoing light source presuming apparatus 20 of the embodiment 2, the correction candidate light source colors in which the candidate light source colors have been corrected so as to be guided to the guide light source color are obtained, the error f value is obtained, and the correction candidate light source color whose error f value is the minimum is presumed as a light source color. However, in the light source presuming apparatus 100 of the embodiment 3, feature amounts regarding the coloration before and after the candidate light source colors are converted by using the color adaptation model are compared and the candidate light source color in which a difference between them is the minimum is presumed as a light source color.

Figure 12:
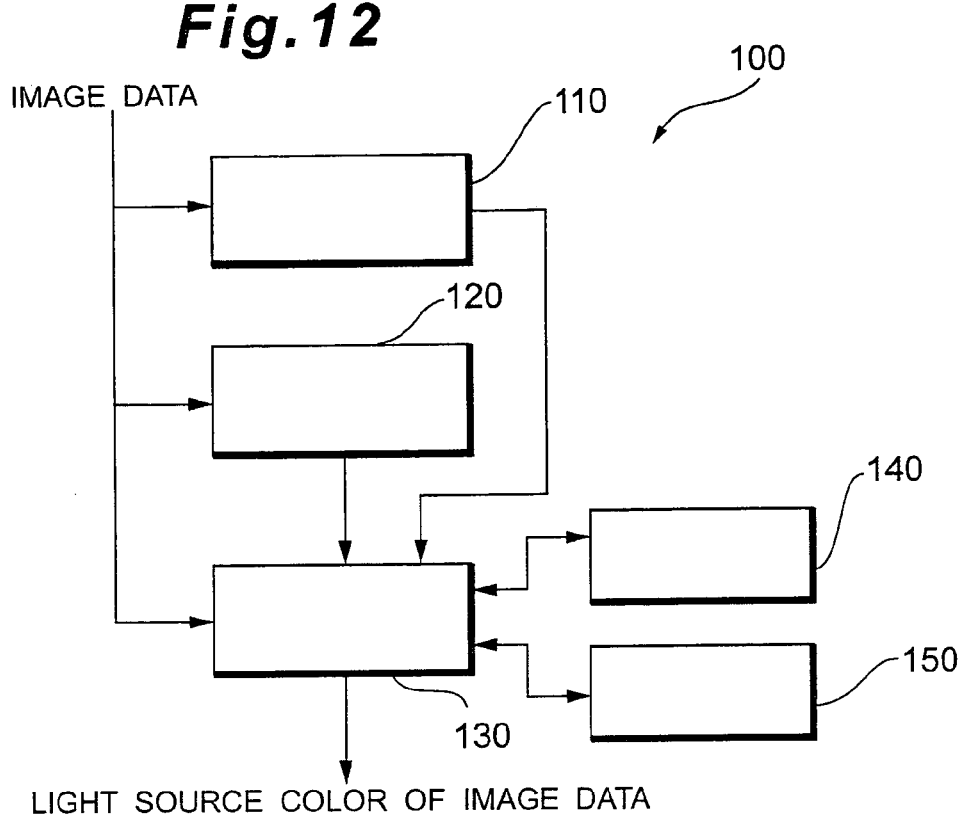
FIG. 12 is a block diagram of a light source presuming apparatus according to the embodiment 3.

FIG. 12 is a block diagram showing a construction of the light source presuming apparatus 100 of the embodiment 3.

The light source presuming apparatus 100 includes: a first distribution value obtaining unit 110 which obtains a first distribution value in which the feature amount regarding the coloration of the image data has been converted into a numerical value; a candidate light source color obtaining unit 120 which obtains a plurality of candidates for the light source color as candidate light source colors from the image data; a light source color presuming unit 130 which compares a second distribution value, which will be explained hereinafter, obtained every obtained candidate light source color with the first distribution value and selects the candidate light source color, as a light source color, corresponding to the second distribution value in which a difference between them is the minimum; a conversion parameter obtaining unit 140 which calculates the parameters, as conversion parameters, of the color adaptation model for converting the image data from the candidate light source colors into the predetermined reference light source color; and a second distribution value obtaining unit 150 which obtains a second distribution value showing a feature amount regarding the coloration of the conversion image data in which the image data has been converted by using the color adaptation model shown by the obtained conversion parameters.

Figure 13:
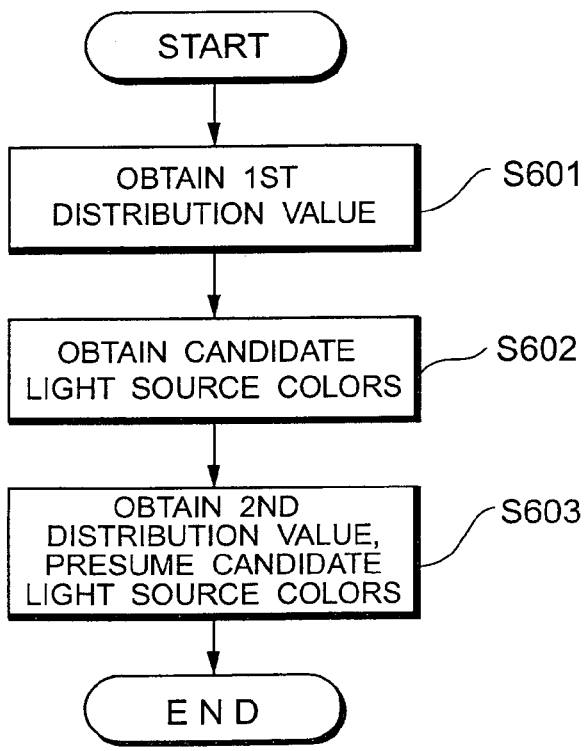
FIG. 13 is a flowchart showing the operation of the light source presuming apparatus in the embodiment 3.

The operation of the light source presuming apparatus 100 will now be described with reference to a flowchart shown in FIG. 13.

Since each pixel of the image data is ordinarily (R, G, B) expressed by the RGB calorimetric system as mentioned above as a prerequisite in a manner similar to each of the foregoing embodiments, it is converted from (R, G, B) into (X, Y, Z) of the XYZ calorimetric system. Normalization is performed in order to align the value of Y of converted (X, Y, Z) to a predetermined value Y(S). Thus, the brightness Y in the XYZ calorimetric system is restricted and the processes can be executed with respect to X and Z showing the coloration (saturation and hue) in the XYZ calorimetric system.

The first distribution value obtaining unit 110 examines each pixel of the image data and calculates the first distribution value (step S601).

The first distribution value obtaining unit 110 obtains coloration E of each normalized pixel as shown by the following equation (20) and obtains a distribution value of the coloration shown by the following equation (21) as a first distribution value V1 by using the coloration E. N in the equation (21) indicates the total number of pixels of the image data and E(*) denotes an average of the coloration E of all pixels. The obtained first distribution value V1 is a numerical value showing the feature regarding the coloration of the image data.

$$E = \sqrt{X^2 + Z^2} \qquad (20)$$

and $$V = \frac{1}{N}\Sigma(E - E(^*))^2 \qquad (21)$$

The candidate light source color obtaining unit 120 of the light source presuming apparatus 100 selects a plurality of pixels which seem to be the light source color from the image data and obtains the chromaticity coordinate values of each selected pixel as candidate light source colors (step S602) in a manner similar to the foregoing embodiment 1. This state is shown in FIG. 5.

The light source color presuming unit 130 obtains the distribution value of the coloration of the conversion image data obtained by converting the image data as a second distribution value every candidate light source color with respect to the candidate light source colors by using the color adaptation model having the relation of the color adaptation of the sense of sight with the predetermined reference light source color, compares the first distribution value with each of the second distribution values, presumes the candidate light source color used for calculating the second distribution value in which a difference between them is the minimum as a light source color, and outputs the chromaticity coordinate values of the candidate light source color (step S603).

Figure 14:
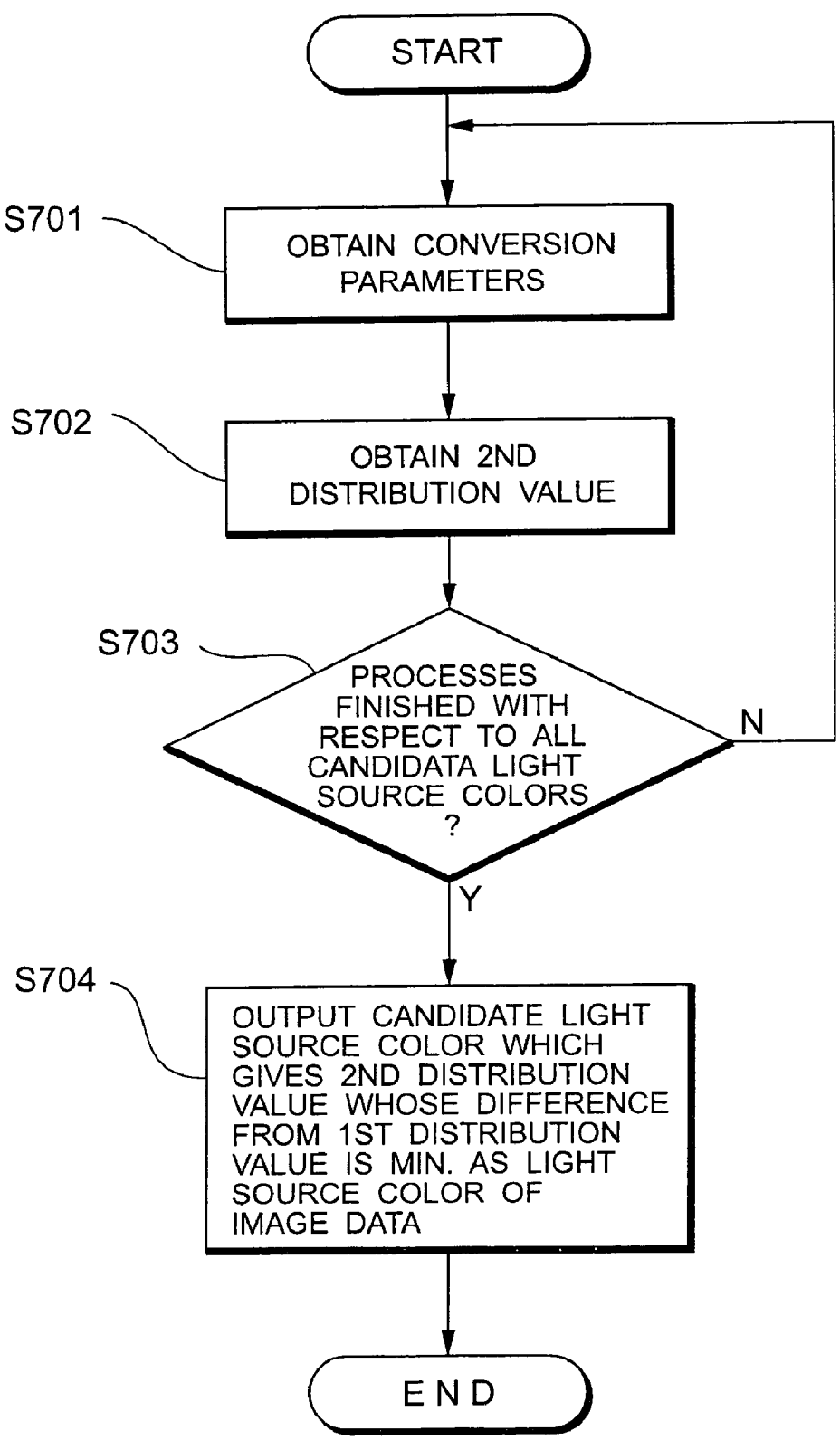
FIG. 14 is a flowchart showing the operation of a light source color presuming unit in the embodiment 3.

The operation of the light source color presuming unit 130 will now be described in detail with reference to a flowchart shown in FIG. 14.

The light source color presuming unit 130 obtains the parameters of the color adaptation model having the relation of the color adaptation of the sense of sight with the predetermined reference light source color P* from the conversion parameter obtaining unit 140 with respect to the candidate light source colors obtained by the candidate light source color obtaining unit 120 (step S701).

The color adaptation model is the same as the matrix M of the equation (3) used in the embodiment 1. $k_L$, $k_M$, and $k_S$ in the equation (3) show parameters of the color adaptation model. When there is a relation shown by the following equation (22) among the color adaptation model M, chromaticity coordinate values ($X_a$, $Y_a$, $Z_a$) of the candidate light source color, and chromaticity coordinate values ($X^*$, $Y^*$, $Z^*$) of the predetermined reference light source color $P^*$, by solving simultaneous linear equations with three unknowns regarding $k_L$, $k_M$, and $k_S$ of the color adaptation model, the values $k_L$, $k_M$, and $k_S$ of the parameters of the color adaptation model are calculated as conversion parameters.

Although the parameters $k_L$, $k_M$, and $k_S$ of the matrix M of the color adaptation model are obtained by the Lagrangean undetermined multiplier method in the foregoing embodiment 1, the conversion parameters $k_L$, $k_M$, and $k_S$ are obtained by solving the simultaneous linear equations with three unknowns in the embodiment 3.

$$\begin{bmatrix} X_* \\ Y_* \\ Z_* \end{bmatrix} = M \begin{bmatrix} X_a \\ Y_a \\ Z_a \end{bmatrix} \quad (22)$$

The image data is converted by using the matrix M obtained by substituting the obtained values of $k_L$, $k_M$, and $k_S$ into the equation (3), thereby forming the conversion image data. This conversion is shown by the following equation (23). ($X_a$, $Y_a$, $Z_a$) in the equation (23) denote the chromaticity coordinate values of each pixel of the image data and ($X^*$, $Y^*$, $Z^*$) denote the chromaticity coordinate values in which ($X_a'$, $Y_a'$, $Z_a'$) have been converted by the color adaptation model M. After that, in a manner similar to the case of obtaining the first distribution value, a second distribution value V2 in which the feature regarding the coloration of the conversion image data has been converted into a numerical value is obtained from the second distribution value obtaining unit 150 by using the equations (21) and (22) (step S702).

$$\begin{bmatrix} X_* \\ Y_* \\ Z_* \end{bmatrix} = M \begin{bmatrix} X_a' \\ Y_a' \\ Z_a' \end{bmatrix} \quad (23)$$

The light source color presuming unit 130 repeats the processes of steps S701 and S702 with respect to all of the candidate light source colors obtained by the candidate light source color obtaining unit 120 until the second distribution value is obtained (step S703).

On the other hand, when the obtainment of the second candidate light source colors for the candidate light source colors is finished, the light source color presuming unit 130 obtains a difference between the first distribution value and each of the second distribution values, selects the second distribution value in which such a difference is the minimum, presumes the candidate light source color used for calculating the conversion image data corresponding to such a second distribution value as a light source color of the image data, and outputs the chromaticity coordinate values of the presumed candidate light source color (step S704).

As mentioned above, according to the light source presuming apparatus of the embodiment 3, the first distribution value V1 in which the feature amount regarding the coloration of the image data has been converted into the numerical value is obtained. Each second distribution value V2 in which the feature amount regarding the coloration of each conversion image data obtained by converting the image data by using each color adaptation model showing the color adaptation of the sense of sight from each candidate light source color to the predetermined reference light source color has been converted into the numerical value is obtained. The second distribution value in which the difference between the first distribution value and each of the second distribution values is the minimum is selected. The candidate light source color used for calculating the second distribution value is presumed as a light source color. Thus, according to the light source presuming apparatus of the embodiment 3, whether or not the candidate light source color is the light source color can be presumed on the basis of whether or not the feature amount regarding the coloration is maintained before and after the image data is converted by using the color adaptation model corresponding to each candidate light source color.

Embodiment 4

Although the parameters of the color adaptation model having the relation of the color adaptation of the sense of sight with the predetermined reference light source color are obtained with respect to the candidate light source colors in the foregoing embodiment 3, embodiment 4 differs therefrom with respect to a point that the parameters of the color adaptation model having the relation of the color adaptation of the sense of sight with the reference light source color are calculated with respect to the correction candidate light source colors corrected so as to converge the errors included in the candidate light source colors.

Although the correction of the errors included in the candidate light source colors is a process similar to that shown in the foregoing embodiment 1, an example in which the errors are converged without using the guide light source color will now be described.

Figure 15:
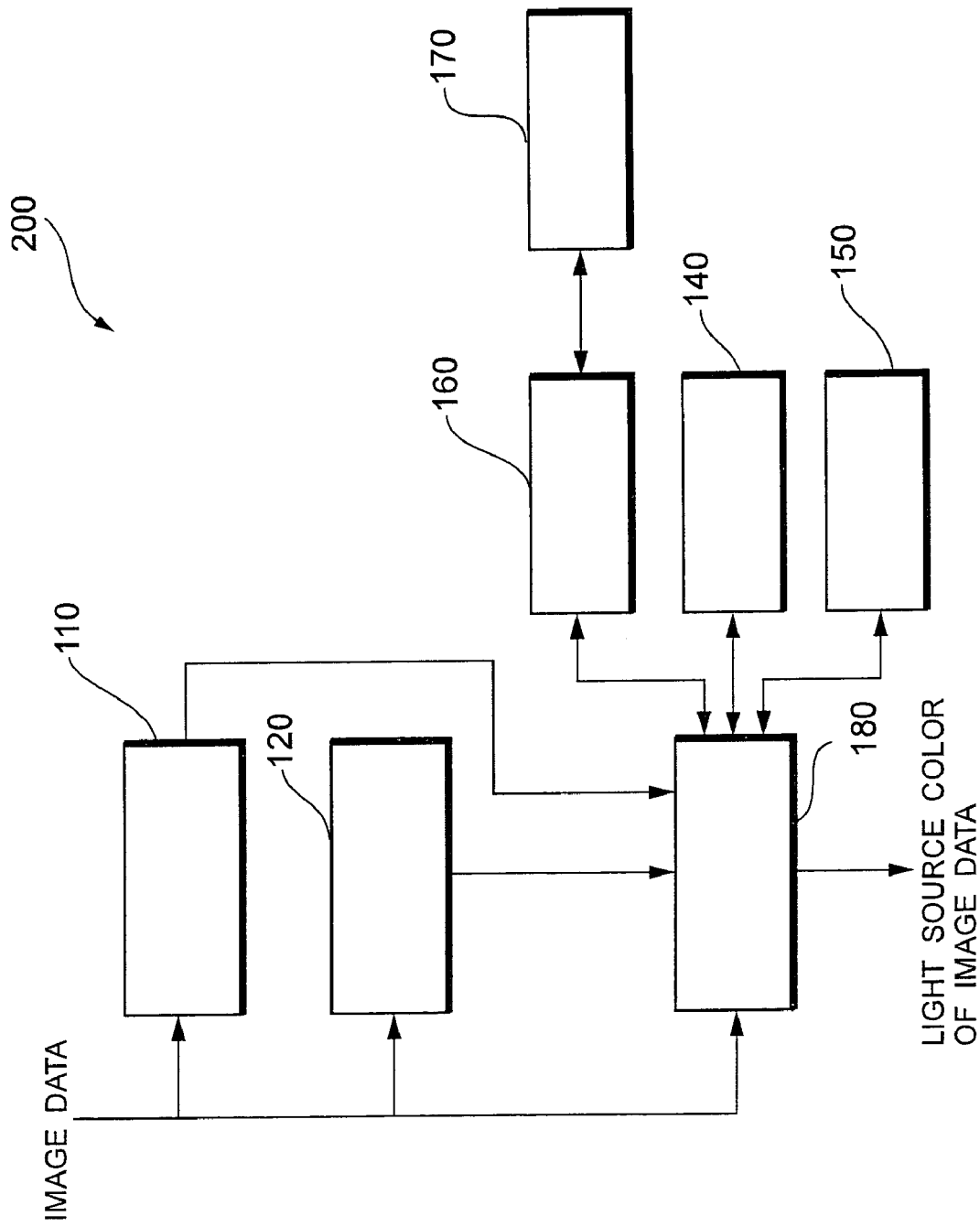
FIG. 15 is a block diagram of a light source presuming apparatus according to the embodiment 4.

FIG. 15 is a block diagram showing a light source presuming apparatus 200 according to the embodiment 4.

The light source presuming apparatus 200 includes: the first distribution value obtaining unit 110 which obtains the first distribution value in which the feature amount regarding the coloration of the image data has been converted into a numerical value; the candidate light source color obtaining unit 120 which obtains a plurality of candidates for the light source color as candidate light source colors from the image data; an error converging unit 160 which converges the error from the true values of the light source color included in the candidate light source colors and obtains the candidate light source colors in which the error has been converged as correction candidate light source colors; a convergence parameter obtaining unit 170 which calculates the parameters of the color adaptation model having a relation showing the color adaptation of the sense of sight with the predetermined reference light source color $P^*$ with respect to the candidate light source colors in which the errors should be converged; the conversion parameter obtaining unit 140 which obtains the parameters of the color adaptation model for converting the image data from the correction candidate light source colors into the predetermined reference light source color; the second distribution value obtaining unit 150 which obtains the second distribution value showing the feature amount regarding the coloration of the conversion image data obtained by converting the image data by using the color adaptation model shown by the conversion parameters obtained by the conversion parameter obtaining unit 140; and a light source color presuming unit 180 which compares the second distribution value with the first distribution value, selects the second distribution value in which a difference between them is the minimum, and selects the candidate light source color corresponding to such a second distribution value as a light source color.

The operation of the light source presuming apparatus 200 is substantially the same as that of the light source presuming apparatus 100 in the embodiment 3 described with reference to the flowchart of FIG. 13 except for the light source color presuming unit 180 and the operation regarding the light source color presuming unit 180.

According to the light source presuming apparatus 200, the first distribution value V1 in which the feature amount regarding the coloration of the image data has been converted into the numerical value is obtained by the first distribution value obtaining unit 110 and the candidate light source color which seems to be the light source color is obtained from the image data by the candidate light source color obtaining unit 120. In the embodiment 4, the following processes are repeated with respect to the obtained candidate light source color: convergence parameters for converging the errors included in the candidate light source color are obtained by the convergence parameter obtaining unit 170; the light source colors having the relation showing the color adaptation of the sense of sight with the reference light source color are obtained as correction candidate light source colors by using the color adaptation model shown by the obtained convergence parameters; and the correction candidate light source colors are substituted for the candidate light source colors. By such processes, the errors included in the candidate light source color are converged by the error converging unit 160 and the candidate light source color in which the errors have been converged is obtained as a correction candidate light source color. The parameters of the color adaptation model showing the color adaptation of the sense of sight to the reference light source color are obtained as conversion parameters by the conversion parameter obtaining unit 140 from the obtained correction candidate light source color. The second distribution value V2 is obtained from the conversion image data obtained by converting the image data by the second distribution value obtaining unit 150 by using the color adaptation model shown by the parameters. The second distribution value in which the difference between the second distribution value and the first distribution value V1 is the minimum is selected. The chromaticity coordinate values of the correction candidate light source color used for obtaining the selected second distribution value are presumed as a light source color by the light source color presuming unit 180.

Figure 16:
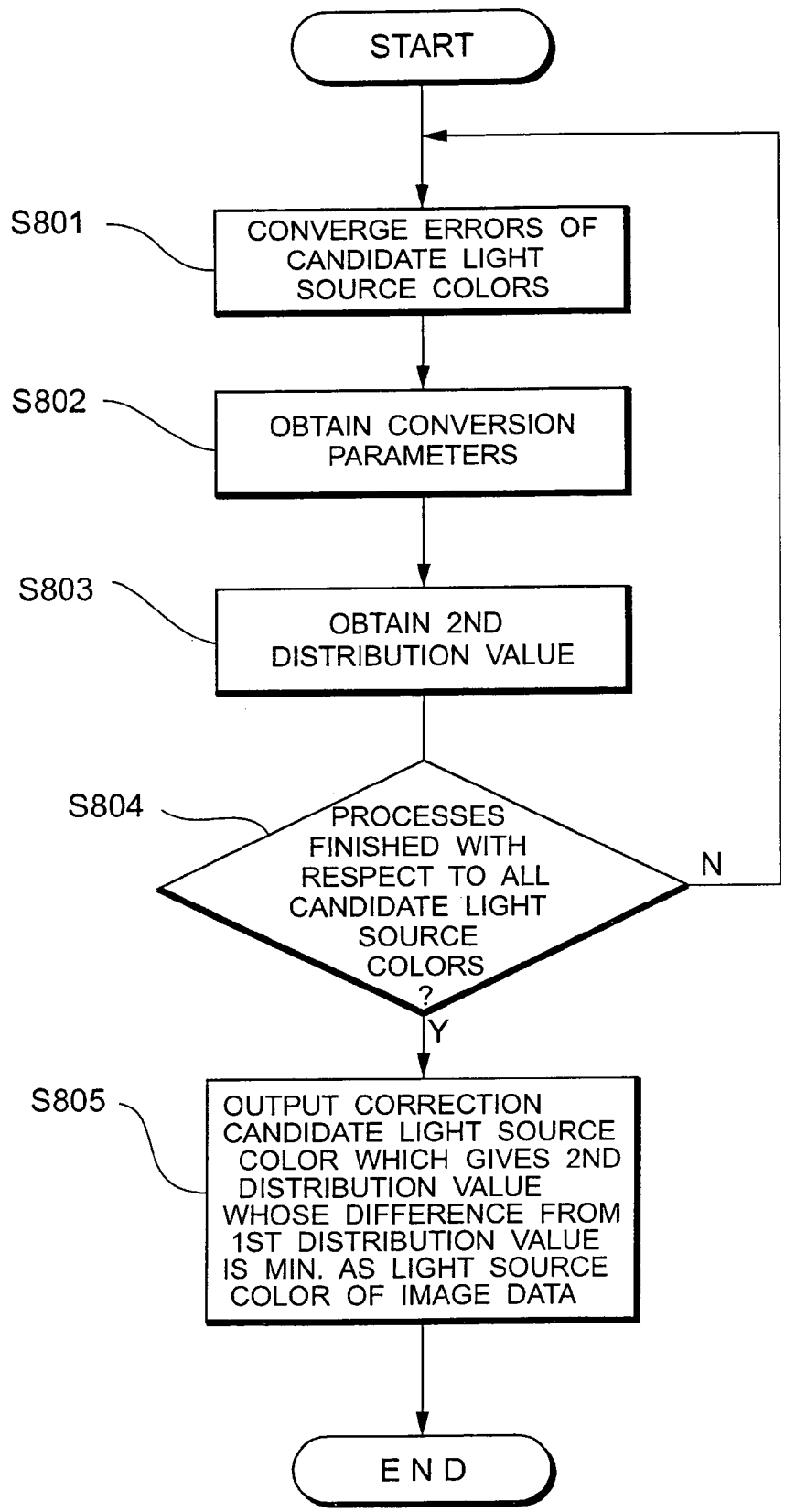
FIG. 16 is a flowchart showing the operation of a light source color presuming unit in the embodiment 4.

The operation of the light source color presuming unit 180 in the embodiment 4 different from the light source color presuming unit 130 in the embodiment 3 will now be described with reference to a flowchart shown in FIG. 16.

The light source color presuming unit 180 obtains the correction candidate light source color in which the errors included in the candidate light source colors obtained by the candidate light source color obtaining unit 120 have been converged from the error converging unit 160 (step S801).

With respect to the correction candidate light source color $(X_a, Y_a, Z_a)$ corrected by the error converging unit 160, the light source color presuming unit 180 solves the simultaneous linear equations with three unknowns shown in the equation (23) mentioned above in order to obtain the parameters $k_L$, $k_M$, and $k_S$ of the color adaptation model M having the relation of the color adaptation of the sense of sight to the predetermined reference light source color P* and obtains their solutions as conversion parameters from the conversion parameter obtaining unit 140 (step S802).

The image data is converted by using the color adaptation model M obtained by substituting the values of the obtained parameters $k_L$, $k_M$, and $k_S$ into the equation (3) and the conversion image data is formed. After that, in a manner similar to the case of obtaining the first distribution value, the second distribution value V2 in which the feature regarding the coloration of the conversion image data has been converted into the numerical value is obtained from the second distribution value obtaining unit 150 (step S703).

In order to execute them for all of the candidate light source colors, the light source color presuming unit 180 repeats such processes that the parameters of the color adaptation model which satisfies the relation of the color adaptation of the sense of sight with the reference light source color are calculated with respect to the correction candidate light source color obtained by correcting the candidate light source color as mentioned above and the second distribution value in which the feature regarding the coloration of the conversion image data obtained by converting the image data into the numerical value by the color adaptation model based on the parameters is obtained (steps S801, S802, and S803) (step S804).

On the other hand, when the process for obtaining each second distribution value with respect to the correction candidate light source color in which the error has been corrected for each candidate light source color is finished, the light source color presuming unit 180 obtains the difference between the first distribution value and each of the second distribution values, selects the second distribution value in which such a difference is the minimum, presumes the correction candidate light source color used for calculating the second distribution value as a light source color, and outputs the chromaticity coordinate values of the selected correction candidate light source color (step S805).

In the light source color presuming unit 130 in the embodiment 3 mentioned above, the chromaticity coordinate values of the selected candidate light source color have been outputted. However, in the light source color presuming unit 180 in the embodiment 4, the chromaticity coordinate values of the correction candidate light source color whose error has been corrected are outputted.

Figure 17:
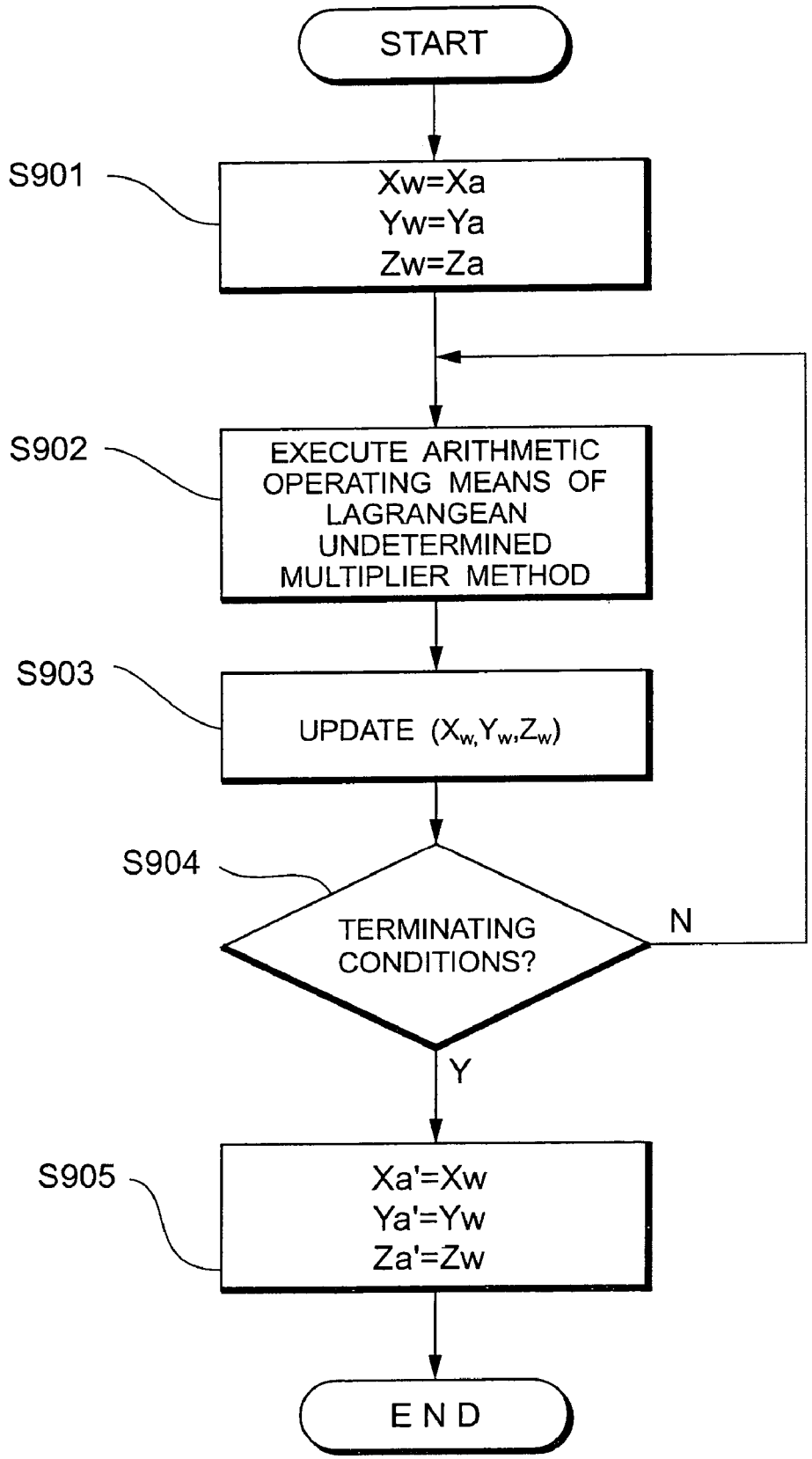
FIG. 17 is a flowchart showing convergence of errors.

Subsequently, the error converging unit 160 which forms the correction candidate light source color will now be described with reference to a flowchart shown in FIG. 17 together with the convergence parameter obtaining unit. Further, the chromaticity coordinate values of the candidate light source color which is processed by the error converging unit 160 are shown by $(X_a, Y_a, Z_a)$, the candidate light source color whose error has been converged is assumed to be the correction candidate light source color P', the chromaticity coordinate values of the correction candidate light source color P' are shown by $(X_a', Y_a', Z_a')$, and the chromaticity coordinates of the predetermined reference light source color P* will be described by using the equation shown by $(X^*, Y^*, Z^*)$.

The chromaticity coordinate values $(X_a, Y_a, Z_a)$ of the candidate light source color are set into the chromaticity coordinate values $(X_W, Y_W, Z_W)$ for converging the errors (step S901).

Subsequently, the convergence parameters $k_L$, $k_M$, and $k_S$ of the color adaptation model M showing the color adaptation of the sense of sight from the chromaticity coordinate values $(X_a, Y_a, Z_a)$ to the predetermined reference light source color $P^*(X^*, Y^*, Z^*)$ are obtained under the restricting condition C shown by the following equation (25) so as to minimize the error f value of the following equation (24) by using the Lagrangean undetermined multiplier method. The restricting condition C denotes that the brightness is maintained before and after the conversion.

$$f = \left( \begin{bmatrix} X_* \\ Y_* \\ Z_* \end{bmatrix} = -M \begin{bmatrix} X_w \\ Y_w \\ Z_w \end{bmatrix} \right)^2 \quad (24)$$

and $$C = \Sigma Y - \Sigma\{(0.14k_L - 0.14k_M)X + (0.26k_L + 0.74k_M)Y + (-0.03k_L + 0.03k_M)Z\} \quad (25)$$

To obtain the parameters $k_L$, $k_M$, and $k_S$ of the color adaptation model which minimize the error f under the restricting condition C, $k_L$, $k_M$, $k_S$, and $\mu$ which minimize F in the equation (9) using the new parameter $\mu$ are obtained. To obtain $k_L$, $k_M$, $k_S$, and $\mu$ which minimize F, it is preferable to solve the equations (10) in which each of them is partially differentiated and set to 0. The equations (10) are linear equations regarding $k_L$, $k_M$, $k_S$, and $\mu$ and if they are arranged in a matrix form, they will be as shown by the following equation (26).

Coefficient matrices a11 to a44 and constant sequence vectors b1 to b4 in the equation (26) are constants obtained by the following equations (27) and (28) from $(X^*, Y^*, Z^*)$, $(X_W, Y_W, Z_W)$, and the chromaticity coordinate values of each pixel of the image data.

$$\begin{bmatrix} a11 & a12 & a13 & a14 \\ a21 & a22 & a23 & a24 \\ a31 & a32 & a33 & a34 \\ a41 & a42 & a43 & a44 \end{bmatrix} \cdot \begin{bmatrix} k_L \\ k_M \\ k_S \\ \mu \end{bmatrix} = \begin{bmatrix} b1 \\ b2 \\ b3 \\ b4 \end{bmatrix} \quad (26)$$

$a11 = 2(B_1{}^2 + C_1{}^2)$ $a12 = 2(B_1 \cdot B_2 + C_1 \cdot C_2)$ $a13 = 2(B_1 B_3 + C_1 C_3)$ $a14 = R_2$ $b1 = -2(B_1 \cdot B_4 + C_1 \cdot C_4)$ $a21 = 2(B_1 \cdot B_2 + C_1 \cdot C_2)$ $a22 = 2(B_2{}^2 + C_2{}^2)$ $a23 = 2(B_2 \cdot B_3 + C_2 \cdot C_3)$ $a24 = R_3$ $b2 = -2(B_2 \cdot B_4 + C_2 \cdot C_4)$ $a31 = 2(B_1 \cdot B_3 + C_1 \cdot C_3)$ $a32 = 2(B_2 \cdot B_3 + C_2 \cdot C_3)$ $a33 = 2(B_3{}^2 + C_3{}^2 + D_1{}^2)$ $a34 = 0$ $b3 = -2(B_3 \cdot B_4 + C_3 \cdot C_4 + D_1 \cdot D_2)$ $a41 = R_2$ $a42 = R_3$ $a43 = 0$ $a44 = 0$ $b4 = R_1$ \quad (27)

$B_1 = -0.74 \cdot X_W - 1.32 \cdot Y_W + 0.15 \cdot Z_W$ $B_2 = -0.26 \cdot X_W + 1.32 \cdot Y_W + 0.05 \cdot Z_W$ $B_3 = -0.2 \cdot Z_W$ $B_4 = X^*$ $C_1 = -0.14 \cdot X_W - 1.26 \cdot Y_W + 0.03 \cdot Z_W$ $C_2 = 0.14 \cdot X_W - 0.74 \cdot Y_W - 0.03 \cdot Z_W$ $C_3 = 0$ $C_4 = Y^*$ $D_1 = -Z_W$ $D_2 = Z^*$ $R_1 = \Sigma Y$ $R_2 = \Sigma(0.14 \cdot X + 0.26 \cdot Y - 0.03 \cdot Z)$ $R_3 = \Sigma(-0.14 \cdot X + 0.74 \cdot Y + 0.03 \cdot Z)$ \quad (28)

By obtaining the coefficient matrices a11 to a44 and the constant sequence vectors b1 to b4 and substituting the obtained values into the equation (26), the parameters $K_L$, $K_M$, and $K_S$ are obtained (step S902).

By obtaining the parameters of the color adaptation model under the restricting condition C which maintains the brightness before and after the conversion as mentioned above, the parameters of the color adaptation model can be properly derived also for the candidate light source color including the errors.

After the parameters $K_L$, $K_M$, and $K_S$ of the color adaptation model are obtained, the inverse conversion of the color adaptation model M obtained by substituting the parameters into the equation (3) as shown by the following equation (29) is performed to the reference light source color P*, thereby obtaining the chromaticity coordinate values $(X'_W, Y'_W, Z'_W)$ of the correction candidate light source color P'. After that, the obtained correction chromaticity coordinate values $(X'_W, Y'_W, Z'_W)$ are substituted for the current chromaticity coordinate values $(X_W, Y_W, Z_W)$ (step S903).

The foregoing processes (steps S902 and S903) are repeated until the processing routine meets the terminating condition (step S904). The following conditions can be mentioned as a terminating condition: the number of times of repeating the foregoing processes exceeds a predetermined number of times; a value of a distance between the correction chromaticity coordinate values $(X'_W, Y'_W, Z'_W)$ and the current chromaticity coordinate values $(X_W, Y_W, Z_W)$ is smaller than a predetermined threshold value; or the like.

$$\begin{bmatrix} X'_w \\ Y'_w \\ Z'_w \end{bmatrix} = M^{-1} \begin{bmatrix} X_* \\ Y_* \\ Z_* \end{bmatrix} \quad (29)$$

As mentioned above, according to the light source presuming apparatus according to the embodiment 4, the first distribution value is obtained from the image data and a plurality of candidate light source colors which seem to be the light source color are obtained from the image data. After that, the parameters of the color adaptation model having the relation of the color adaptation of the sense of sight with the predetermined reference light source color are calculated so as to converge the errors of the candidate light source colors. The parameters of the color adaptation model showing the color adaptation of the sense of sight to the reference light source color from the correction candidate light source colors obtained by performing the inverse conversion of the color adaptation model using the parameters to the reference light source color are calculated. The second distribution value V2 in which the feature amount regarding the coloration of the conversion image data obtained by converting the image data by the color adaptation model shown by the conversion parameters has been converted into the numerical value is obtained. After that, the second distribution value in which the difference between the first distribution value and the second distribution value is the minimum is selected. The chromaticity coordinate values of the correction candidate light source color used for calculating the selected second distribution value are outputted as chromaticity coordinate values of the light source color. Thus, in addition to the effects of the embodiment 3 mentioned above, by performing the correction to the candidate light source colors, the light source color can be precisely presumed.

Embodiment 5

A light source presuming apparatus 300 according to the embodiment 5 obtains at least two or more candidate light source colors from the image data and obtains a plurality of correction candidate light source colors in a lump from a line which connects the chromaticity coordinate values in which the errors included in the candidate light source colors have been converged by using the Lagrangean undetermined multiplier method, respectively, on the XZ plane.

Figure 18:
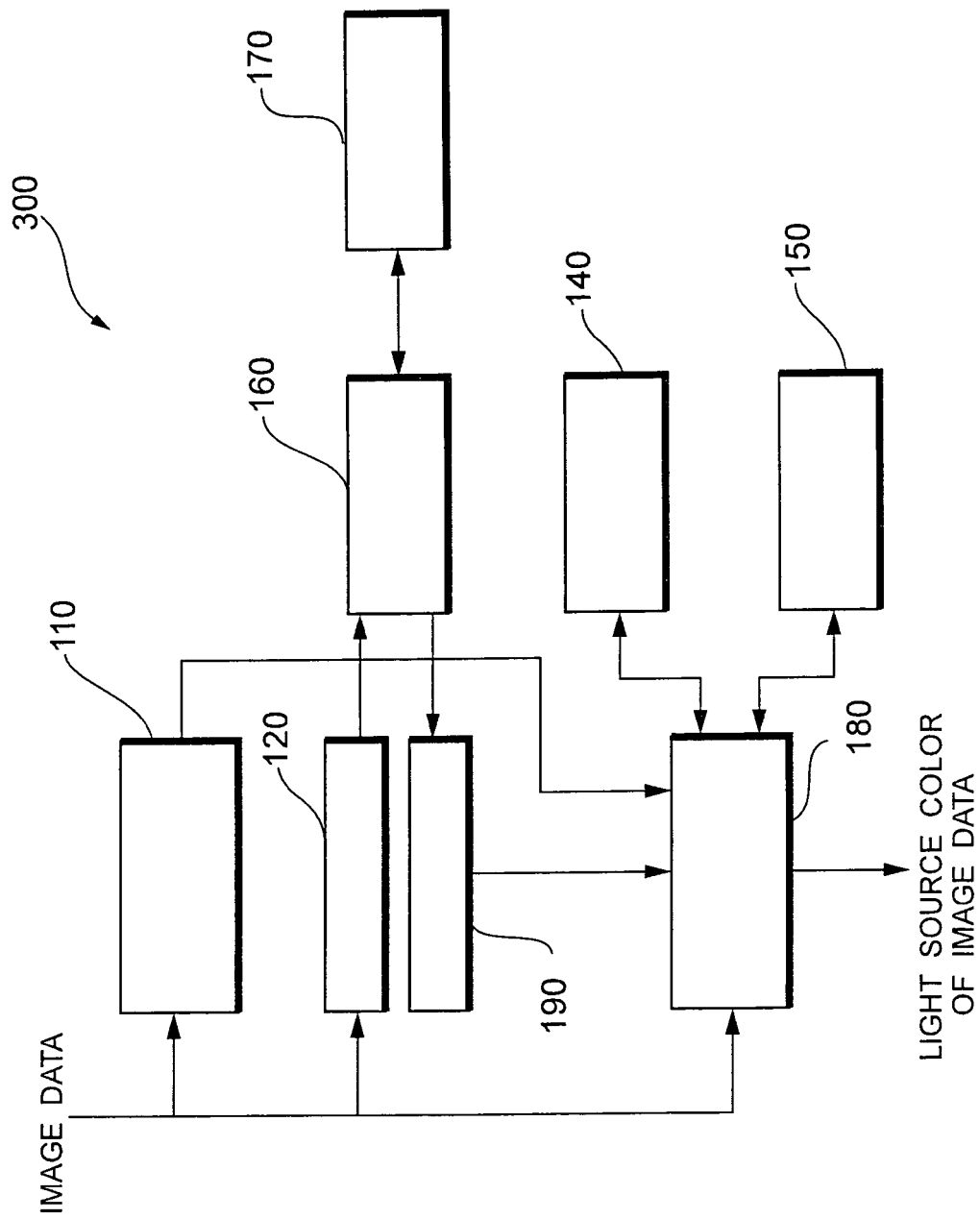
FIG. 18 is a block diagram of a light source presuming apparatus according to the embodiment 5.

A construction of the light source presuming apparatus 300 is shown by a block diagram of FIG. 18.

The light source presuming apparatus 300 includes: the first distribution value obtaining unit 110 which obtains the first distribution value V1 in which the feature amount regarding the coloration of the image data has been converted into the numerical value; the candidate light source color obtaining unit 120 which obtains at least two or more of candidate light source colors which seem to be candidates for the light source color from the image data; the error converging unit 160 which obtains the correction candidate light source colors in which the error from the true values of the light source color of the image data included in the obtained candidate light source colors has been converged; the convergence parameter obtaining unit 170 which calculates the parameters of the color adaptation model having the relation showing the color adaptation of the sense of sight with the predetermined reference light source color P* with respect to the candidate light source colors in which the errors should be converged; a correction candidate light source color obtaining unit 190 which newly obtains a plurality of candidate light source colors in a lump as a plurality of correction candidate light source colors from the line which connects the chromaticity coordinate values of the correction candidate light source colors obtained by the error converging unit 160 on the XZ plane; the conversion parameter obtaining unit 140 which calculates the parameters of the color adaptation model for converting the image data from the correction candidate light source colors into the predetermined reference light source color; the second distribution value obtaining unit 150 which obtains the second distribution value in which the feature amount regarding the coloration of the conversion image data obtained by converting the image data by using the color adaptation model shown by the obtained conversion parameters has been converted into the numerical value; and the light source color presuming unit 180 which compares the second distribution value with the first distribution value, selects the second distribution value in which the difference between them is the minimum, and presumes the correction candidate light source color corresponding to such a second distribution value as a light source color of the image data.

The operation of the light source presuming apparatus 300 of the embodiment 5 will now be described also with reference to the flowchart of FIG. 13 used for explanation of the operation of the light source presuming apparatus 200 of the embodiment 4.

The operation of the light source presuming apparatus 300 of the embodiment 5 is constructed by adding the operation of the correction candidate light source color obtaining unit 190 to the operation of the light source presuming apparatus 200 of the embodiment 4.

The first distribution value V1 in which the feature amount regarding the coloration of the image data has been converted into the numerical value is obtained by the first distribution value obtaining unit 110 (step S601).

When a pair of candidate light source colors whose chromaticity coordinate values differ are obtained from the image data by the candidate light source color obtaining unit 120, a pair of correction candidate light source colors in which the errors included in the candidate light source colors have been converged by the error converging unit 160, respectively, are obtained by using of the color adaptation model shown by the convergence parameters of the color adaptation model obtained by the convergence parameter obtaining unit 170. Further, a plurality of chromaticity coordinate values are obtained in a lump as correction candidate light source colors by the correction candidate light source color obtaining unit 190 from the relational line which connects the chromaticity coordinate values of the obtained correction candidate light source color on the XZ plane (step S602).

With respect to the obtained correction candidate light source colors, the parameters of the color adaptation model having the relation showing the color adaptation of the sense of sight with the reference light source color are obtained as conversion parameters by the conversion parameter obtaining unit. The second distribution value V2 in which the feature amount regarding the coloration of the conversion image data obtained by converting the image data by using the color adaptation model shown by the conversion parameters has been converted into the numerical value is obtained by the second distribution value obtaining unit. After that, the light source color presuming unit selects the second distribution value in which the difference between the first distribution value V1 and the second distribution value V2 is the minimum and outputs the chromaticity coordinate values of the correction candidate light source color used for calculating the selected second distribution value as chromaticity coordinate values of the light source color (step S603).

The obtainment of the correction candidate light source color as a feature of the embodiment 5 will now be described.

Figure 19:
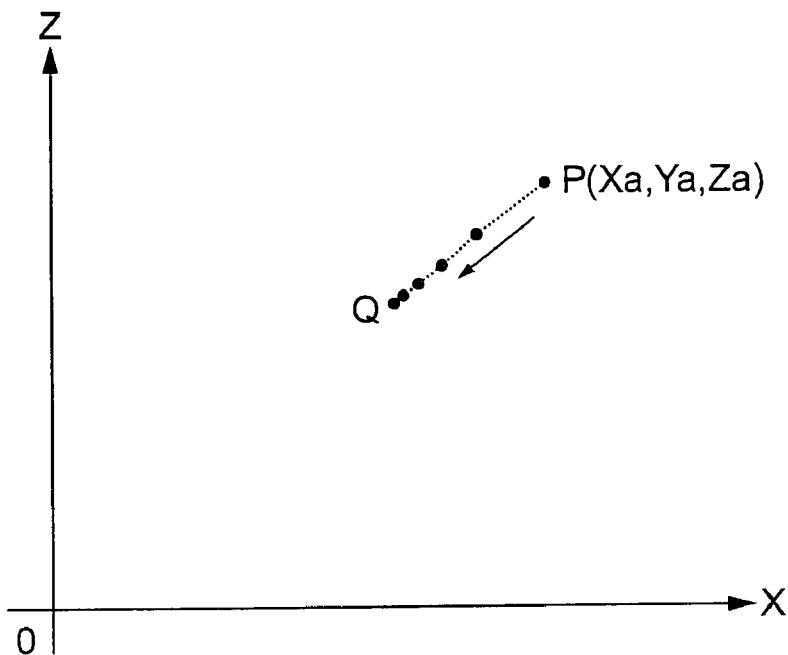
FIG. 19 is a chromaticity coordinate diagram showing a transition of chromaticity coordinate values.

As also mentioned in the embodiment 4, $(X_W, Y_W, Z_W)$ are initialized by the chromaticity coordinate values $(X_a, Y_a, Z_a)$ of the candidate light source color and the convergence parameters are obtained by the convergence parameter obtaining unit 170 by using the Lagrangean undetermined multiplier method. In the error converging unit 160, the chromaticity coordinate values ($X'_W$, $Y'_W$, $Z'_W$) of the correction candidate light source color in which the errors included in the candidate light source color have been corrected by using the color adaptation model shown by the obtained convergence parameters are obtained and the chromaticity coordinate values ($X'_W$, $Y'_W$, $Z'_W$) of the correction candidate light source color are substituted for the current chromaticity coordinate values ($X_W$, $Y_W$, $Z_W$). By repeating the above processes a predetermined number of times, the chromaticity coordinate values of the candidate light source color existing initially at a position of P are gradually shifted to a position of Q as shown in FIG. 19.

Figure 20:
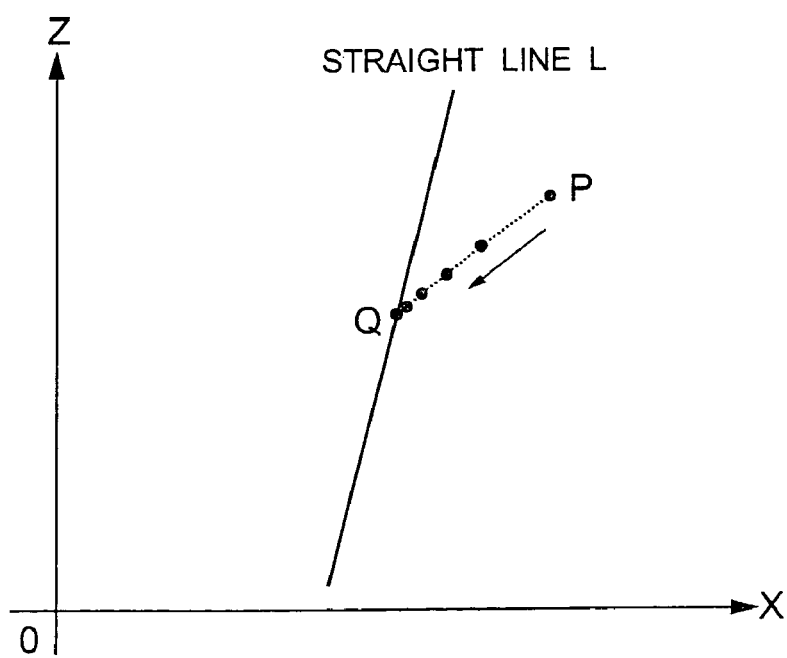
FIG. 20 is a chromaticity coordinate diagram showing a converging range of the chromaticity coordinate values.

Although various conditions are considered as a restricting condition C in the Lagrangean undetermined multiplier method mentioned above, when the errors included in the candidate light source color are converged by using the Lagrangean undetermined multiplier method in the restricting condition shown in the equation (8), they are converged like a line as shown in FIG. 20. That is, the correction is started from the chromaticity coordinate values at various positions on the XZ plane. When the convergence points are shown on the XZ plane, they are converged on a straight line L as shown in the diagram. An inclination of the straight line L and a segment of the Z axis are determined by the contents of the image data and the chromaticity coordinate values ($X^*$, $Y^*$, $Z^*$) of the reference light source color $P^*$.

Figure 21:
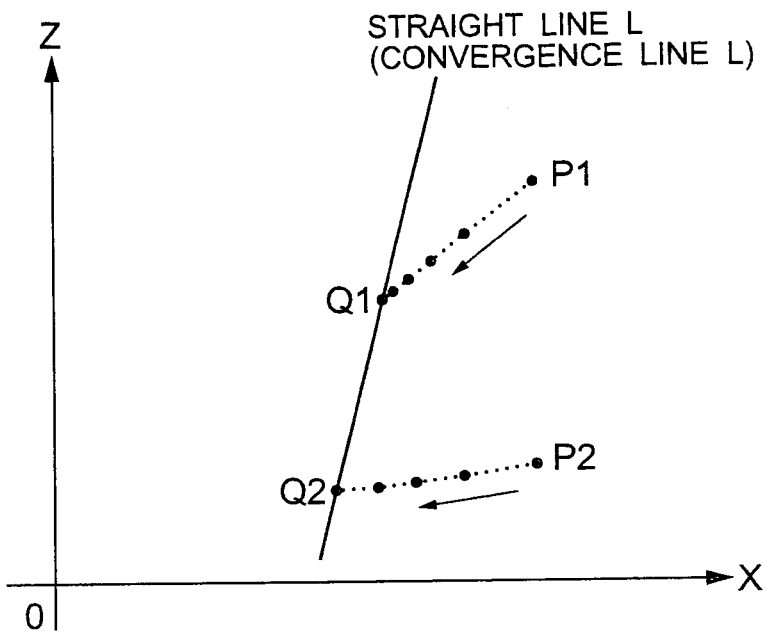
FIG. 21 is a diagram showing the transition of chromaticity coordinate values and a convergence line.

By using such a principle that the errors are converged on the straight line L, the correction candidate light source color obtaining unit 190 in the embodiment 5 obtains the straight line L, as a convergence line, which connects the convergent points at which the errors included in each of the candidate light source colors have been converged by the error converging unit 160 and the convergence parameter obtaining unit 170 with respect to the candidate light source colors whose chromaticity coordinate values are different on the XZ plane. Such a straight line L is shown in FIG. 21. After that, a plurality of chromaticity coordinate values are obtained as correction candidate light source colors from the convergence line.

Figure 22:
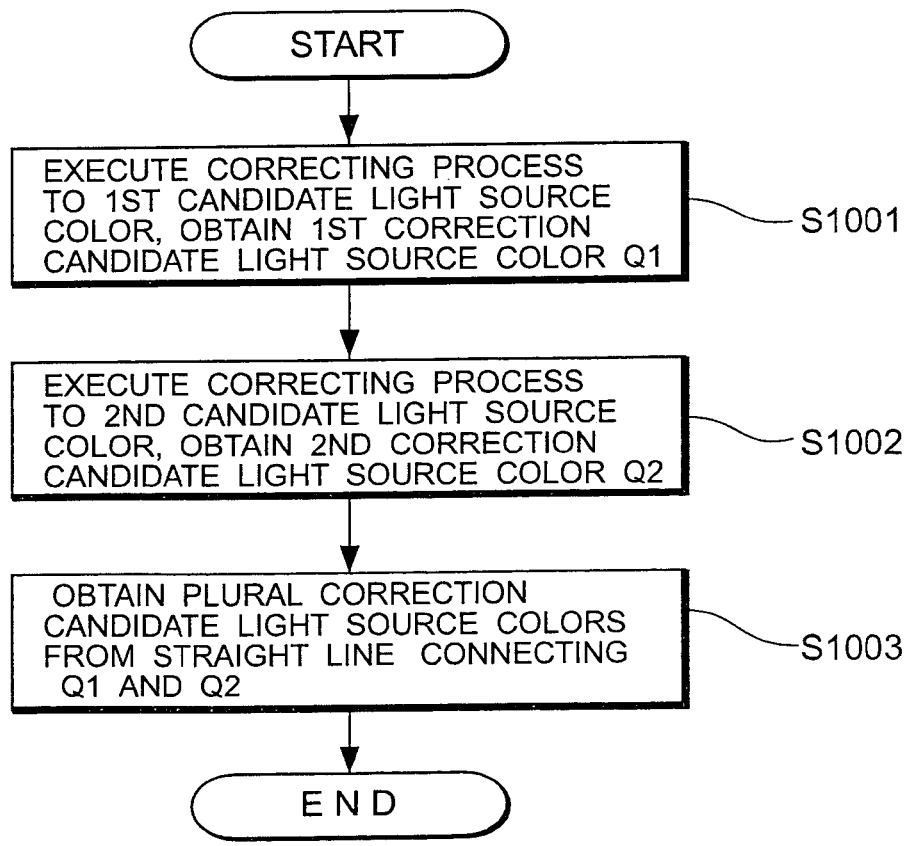
FIG. 22 is a flowchart showing the operation of a correction candidate light source color obtaining unit according to the embodiment 5.

One of the different chromaticity coordinate values obtained by the candidate light source color obtaining unit 120 is assumed to be the first candidate light source color and the other is assumed to be the second candidate light source color. The operation of the correction candidate light source color obtaining unit 190 for obtaining the correction candidate light source colors on the basis of those candidate light source colors will now be described with reference to a flow-chart shown in FIG. 22.

For the first candidate light source color, the correcting process is executed by the error converging unit 160 and the convergence parameter obtaining unit 170, thereby obtaining a first correction candidate light source color Q1 (step S1001).

Subsequently, for the second candidate light source color, the correcting process is executed by the error converging unit 160 and the convergence parameter obtaining unit 170, thereby obtaining a second correction candidate light source color Q2 (step S1002).

The convergence line L connecting the first correction candidate light source color Q1 and the second correction candidate light source color Q2 is obtained and a plurality of correction candidate light source colors are selected from the convergence line L (step S1003).

As mentioned above, according to the light source presuming apparatus 300 of the embodiment 5, after the convergence line L connecting the first correction candidate light source color Q1 and the second correction candidate light source color Q2 on the XZ plane is obtained, by selecting a plurality of correction candidate light source colors from the line L, the correction candidate light source colors can be efficiently obtained in addition to the effects according to the light source presuming apparatus 200 of the embodiment 4 mentioned above.

According to the light source color presuming method of the invention, by obtaining the error from the true values of the light source color included in the candidate light source color by using the color adaptation model with respect to the candidate light source color selected from the image data, the candidate light source color can be evaluated on the basis of the obtained error.

On the other hand, the difference between the candidate light source color and the light source color before the conversion using the color adaptation model showing the color adaptation of the sense of sight is compared with the difference after the conversion and the chromaticity coordinate values of the candidate light source color in which the difference is the minimum is set to the light source color, so that whether or not the candidate light source color is the light source color can be presumed.

The present invention is not limited to the foregoing embodiments but many modifications and variations are possible within the spirit and scope of the appended claims of the invention.

What is claimed is:

1. A light source presuming method of presuming a light source color of image data, comprising the steps of:
   obtaining candidate light source color as candidates for the light source color of said image data;
   obtaining parameters of a color adaptation model showing color adaptation of a sense of sight from said obtained candidate light source color to a predetermined reference light source color so as to be guided to parameters of a color adaptation model showing color adaptation of the sense of sight from known guide light source color to said reference light source color;
   obtaining light source color, as correction candidate light source color, having a relation of the color adaptation of the sense of sight with said reference light source color in a model state shown by said obtained guide parameters, substituting said correction candidate light source color for said candidate light source color, and converging errors included in said candidate light source color; and
   presuming the correction candidate light source color whose errors are minimized by the convergence as a light source color of said image data.

2. The light source presuming method according to claim 1, wherein said candidate light source color to be obtained includes a plurality of different light source colors.

3. The light source presuming method according to claim 1, wherein said guide light source color includes a plurality of different light source colors.

4. The light source presuming method according to claim 1, wherein the parameters of said color adaptation model are obtained by a Lagrangean undetermined multiplier method in which a restricting condition for maintaining brightness before and after conversion of the image data according to said color adaptation model has been set.

5. The light source presuming method according to claim 1, wherein:
   a second guide light source color is set near the guide light source color corresponding to said correction candidate light source color so as to further converge the errors included in the correction candidate light source color which has been presumed as a light source color;

said correction candidate light source color which has been presumed as a light source color is newly set as a candidate light source color;

the parameters of the color adaptation model showing the color adaptation of the sense of sight from said candidate light source colors to said reference light source color are obtained so as to be guided to parameters of a color adaptation model showing color adaptation of the sense of sight from said second guide light source color to said reference light source color;

light source colors having a relation of the color adaptation of the sense of sight with said reference light source color are newly obtained as correction candidate light source colors in a model state shown by said newly obtained guide parameters, said correction candidate light source colors are substituted for said candidate light source colors, and errors included in said newly set candidate light source colors are converged; and the correction candidate light source color whose errors are minimized by the convergence is presumed as a light source color of said image data.

6. The light source presuming method according to claim 5, wherein said guide light source colors which are newly set are a plurality of different light source colors.

7. A light source presuming apparatus for presuming a light source of image data, comprising:

a candidate light source color obtaining unit which obtains candidate light source color as candidates for the light source color of said image data;

a guide light source color holding unit which holds known guide light source color so as to guide obtainment of parameters of a color adaptation model showing color adaptation of a sense of sight from said obtained candidate light source color to a predetermined reference light source color;

a guide parameter obtaining unit which obtains the parameters of the color adaptation model showing the color adaptation of the sense of sight from said obtained candidate light source color to said reference light source coloro as to be guided to parameters of a color adaptation model showing a color adaptation of the sense of sight from said guide light source color held in said guide light source color holding unit to said reference light source color;

an error converging unit which obtains light source color, as correction candidate light source color, having a relation of the color adaptation of the sense of sight with said reference light source color in a model state shown by said obtained guide parameters, substituting said correction candidate light source color for said candidate light source color, and converging errors included in said candidate light source color; and a light source color presuming unit which presumes the correction candidate light source color whose errors are minimized by the convergence as a light source color of said image data.

8. The light source presuming apparatus according to claim 7, wherein said candidate light source color to be obtained includes a plurality of different light source colors.

9. The light source presuming apparatus according to claim 7, wherein said guide light source color includes a plurality of different light source colors.

10. The light source presuming apparatus according to claim 7, wherein the parameters of said color adaptation model are obtained by a Lagrangean undetermined multiplier method in which a restricting condition for maintaining brightness before and after conversion of the image data according to said color adaptation model has been set.

11. The light source presuming apparatus according to claim 7, further comprising a guide light source color resetting unit which sets a second guide light source color to a position near the guide light source color corresponding to said correction candidate light source color so as to further converge the errors included in the correction candidate light source color which has been presumed as a light source color, and wherein after said correction candidate light source color which has been presumed as a light source color is newly set as a candidate light source color, in said guide parameter obtaining unit, the parameters of the color adaptation model showing the color adaptation of the sense of sight from said obtained candidate light source colors to said predetermined reference light source color are obtained so as to be guided to parameters of a color adaptation model showing color adaptation of the sense of sight from said second guide light source colors to said reference light source color, in said error converging unit, in a model state shown by said obtained guide parameters, light source colors having a relation of the color adaptation of the sense of sight with said reference light source color is newly obtained as correction candidate light source colors, said correction candidate light source colors are substituted for said candidate light source colors, and errors included in said newly set candidate light source color are converged, and said apparatus has a second light source color presuming unit which presumes the correction candidate light source color whose errors are minimized by the convergence as a light source color of said image data.

12. The light source presuming apparatus according to claim 11, wherein said guide light source colors which are newly set are a plurality of different candidate light source colors.

13. A light source presuming apparatus for presuming a light source color of image data, comprising:

a first distribution value obtaining unit which obtains a first distribution value in which a feature amount regarding coloration of said image data has been converted into a numerical value;

a candidate light source color obtaining unit which obtains candidate light source colors as candidates for the light source color of said image data;

a conversion parameter obtaining unit which obtains parameters, as conversion parameters, of a color adaptation model showing color adaptation of a sense of sight from said obtained candidate light source colors to a predetermined reference light source color;

a second distribution value obtaining unit which obtains a second distribution value in which a feature amount regarding coloration of conversion image data obtained by converting said image data by using a color adaptation model shown by said obtained conversion parameters has been converted into a numerical value; and a light source-color presuming unit which compares said obtained second distribution value with said first distribution value, selects the second distribution value in which a difference between them is the minimum, and presumes the candidate light source color corresponding to said selected second distribution value as a light source color of said image data.

14. The light source presuming apparatus according to claim 13, wherein said candidate light source colors which are obtained are a plurality of different light source colors.

15. The light source presuming apparatus according to claim 13, further comprising:

a convergence parameter obtaining unit which obtains the parameters, as convergence parameters, of the color adaptation model showing the color adaptation of the sense of sight from said candidate light source colors to said reference light source color so as to converge errors included in said obtained candidate light source colors; and an error converging unit which obtains light source colors, as correction candidate light source colors, having a relation of the color adaptation of the sense of sight with said reference light source color in a model state shown by said obtained convergence parameters, substitutes said correction candidate light source colors for said candidate light source colors, and converges the errors included in said candidate light source colors.

16. The light source presuming apparatus according to claim 15, wherein the convergence parameters of said color adaptation model are obtained by using a Lagrangean undetermined multiplier method in which a restricting condition for maintaining brightness before and after conversion of the image data according to said color adaptation model has been set.

17. The light source presuming apparatus according to claim 14, further comprising:

a convergence parameter obtaining unit which obtains the parameters, as convergence parameters, of the color adaptation model showing the color adaptation of the sense of sight from said candidate light source colors to said reference light source color so as to converge errors included in said obtained candidate light source colors;

an error converging unit which obtains light source colors, as correction candidate light source colors, having a relation of the color adaptation of the sense of sight with said reference light source color in a model state shown by said obtained convergence parameters, substitutes each of said correction candidate light source colors for each of said candidate light source colors, and converges the errors included in each of said candidate light source colors; and a correction candidate light source color obtaining unit which newly obtains a plurality of candidate light source colors as correction candidate light source colors from a relational line which mutually connects chromaticity coordinate values of the candidate light source colors whose errors have been converged.

18. The light source presuming apparatus according to claim 17, wherein the convergence parameters of said color adaptation model are obtained by using a Lagrangean undetermined multiplier method in which a restricting condition for maintaining brightness before and after conversion of the image data according to said color adaptation model has been set.

* * * * *